United States Patent
Kobayashi et al.

(10) Patent No.: US 11,618,356 B2
(45) Date of Patent: Apr. 4, 2023

(54) VEHICLE SEAT

(71) Applicant: TS TECH CO., LTD., Asaka (JP)

(72) Inventors: Sachio Kobayashi, Tochigi (JP);
Hayato Shimazaki, Tochigi (JP);
Kazuhiro Oshima, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/230,585

(22) Filed: Apr. 14, 2021

(65) Prior Publication Data

US 2021/0229581 A1    Jul. 29, 2021

Related U.S. Application Data

(63) Continuation of application No. 16/547,970, filed on Aug. 22, 2019, now Pat. No. 11,001,176, which is a (Continued)

(30) Foreign Application Priority Data

Apr. 11, 2014 (JP) .................................. 2014-081976

(51) Int. Cl.
*B60N 2/60* (2006.01)
*B60N 2/56* (2006.01)
(Continued)

(52) U.S. Cl.
CPC ......... *B60N 2/5657* (2013.01); *B60N 2/5635* (2013.01); *B60N 2/68* (2013.01);
(Continued)

(58) Field of Classification Search
CPC .. B60N 2/5657; B60N 2/5621; B60N 2/5642; A47C 7/744
See application file for complete search history.

(56) References Cited

U.S. PATENT DOCUMENTS

| 5,927,817 A | 7/1999 | Ekman et al. |
| 6,048,024 A | 4/2000 | Wallman |
| (Continued) | | |

FOREIGN PATENT DOCUMENTS

| CN | 1513699 | 7/2004 |
| JP | S5482014 | 6/1979 |
| (Continued) | | |

OTHER PUBLICATIONS

International Search Report for PCT/JP2015/060564, dated Jun. 16, 2015, 3 pages including English translation.
(Continued)

*Primary Examiner* — Syed A Islam
(74) *Attorney, Agent, or Firm* — Hamre, Schumann, Mueller & Larson, P.C.

(57) ABSTRACT

There is provided a vehicle seat (car seat) comprising a seat cushion pad (seat body) having an air passage connected to an outlet port (114), and a blower having an inlet port (113) and configured to feed air taken in through the inlet port (113) to the air passage. The blower (100) is located on the lower side of the seat cushion pad (seat body) that is opposite to an occupant's side on which an occupant is to be seated, and the inlet port (113) is directed upward that is a direction toward the seat cushion pad (seat body).

11 Claims, 17 Drawing Sheets

Related U.S. Application Data continuation of application No. 15/303,379, filed as application No. PCT/JP2015/060564 on Apr. 3, 2015, now Pat. No. 10,399,470.

(51) Int. Cl.
  *B60N 2/68* (2006.01)
  *B60N 2/70* (2006.01)
  *A47C 7/74* (2006.01)

(52) U.S. Cl.
  CPC .............. *B60N 2/682* (2013.01); *B60N 2/70* (2013.01); *A47C 7/744* (2013.01); *B60N 2/5621* (2013.01); *B60N 2/5642* (2013.01)

(56) References Cited

U.S. PATENT DOCUMENTS

| | | | |
|---|---|---|---|
| 7,222,916 B2 | 5/2007 | De Wilde et al. | |
| 7,261,372 B2 | 8/2007 | Aoki | |
| 7,275,984 B2 | 10/2007 | Koki | |
| 7,419,209 B1 | 9/2008 | Mangiapane et al. | |
| 7,425,034 B2 | 9/2008 | Bajic et al. | |
| 7,591,507 B2 | 9/2009 | Giffin et al. | |
| 7,607,739 B2 | 10/2009 | Browne et al. | |
| 7,647,780 B2 | 1/2010 | Aoki et al. | |
| 7,963,595 B2 * | 6/2011 | Ito | B60N 2/5657 297/180.13 |
| 8,727,434 B2 | 5/2014 | Sahashi | |
| 8,998,311 B2 * | 4/2015 | Axakov | B60N 2/002 297/180.13 |
| 9,121,414 B2 | 9/2015 | Lofy et al. | |
| 9,694,716 B2 | 7/2017 | Masuda | |
| 2004/0164594 A1 | 8/2004 | Stoewe et al. | |
| 2006/0087160 A1 | 4/2006 | Dong et al. | |
| 2007/0101729 A1 | 5/2007 | Aoki et al. | |
| 2007/0176470 A1 | 8/2007 | Stoewe et al. | |
| 2009/0027029 A1 | 1/2009 | Yabe et al. | |
| 2013/0328359 A1 | 12/2013 | Antonov et al. | |
| 2015/0061331 A1 | 3/2015 | Yang | |
| 2015/0274049 A1 | 10/2015 | Langensiepen et al. | |
| 2017/0282765 A1 | 10/2017 | Stroeters et al. | |
| 2018/0105083 A1 | 4/2018 | Tsuzaki et al. | |
| 2018/0111526 A1 | 4/2018 | Okimura et al. | |

FOREIGN PATENT DOCUMENTS

| | | |
|---|---|---|
| JP | 2001514028 | 9/2001 |
| JP | 2005343288 | 12/2005 |
| JP | 2007126047 | 5/2007 |
| JP | 2009012550 | 1/2009 |
| JP | 2009033452 | 2/2009 |
| JP | 2012165830 | 9/2012 |
| JP | 2012206649 | 10/2012 |
| JP | 2013066571 | 4/2013 |
| JP | 2013177027 | 9/2013 |

OTHER PUBLICATIONS

Office Action issued for Japanese Patent Application No. 2014-081974, dated Oct. 24, 2017, 7 pages including English translation.
Office Action issued for Chinese Patent Application No. 201580019122.8, dated Dec. 5, 2017, 8 pages including English translation.
Office Action issued for Japanese Patent Application No. 2014-081974, dated Feb. 19, 2019, 8 pages including English translation.
Office Action issued for Japanese Patent Application No. 2016-512696, dated Feb. 26, 2019, 11 pages including English translation.
Office Action issued for Japanese Patent Application No. 2014-081974, dated Oct. 1, 2019, 7 pages including English translation.

\* cited by examiner (a)

(b)

(a)

(b)

VEHICLE SEAT

TECHNICAL FIELD

The present invention relates to a vehicle seat capable of blowing air from a seat body.

BACKGROUND ART

A vehicle seat with an air conditioning function is conventionally known (e.g., Patent Document 1), in which vehicle seat air can be blown from a seat cushion toward an occupant. This vehicle seat is provided with a blower (fan) under the seat cushion and configured such that air taken in through an inlet port of the blower is blown from the seat cushion.

CITATION LIST

Patent Literature

Patent Document 1: JP 2013-66571 A

SUMMARY OF THE INVENTION

Technical Problem

However, the structure disclosed in Patent Document 1 includes the blower having an inlet port that is directed downward, by means of which foreign substances such as dust on the floor of the vehicle may be taken in through the inlet port.

In view of the above, an object of the present invention is to provide a vehicle seat which can reduce foreign substances (e.g., dust) taken in through the inlet port.

Solution to Problem

In order to achieve the above object, a vehicle seat according to the present invention comprises: a seat body having an air passage connected to an outlet port; and a blower having an inlet port and configured to feed air taken in through the inlet port to the air passage, wherein the blower is located on one side of the seat body that is opposite to an occupant's side on which an occupant is to be seated, and wherein the inlet port is directed toward the seat body.

With this configuration, since the inlet port of the blower is directed toward the seat body, foreign substances (e.g., dust) are unlikely to be taken in through the inlet port.

The above vehicle seat may further comprise a bracket located on the seat body at a position opposite to the inlet port and used to fix the blower to the seat body.

With this configuration, the bracket used therein can serve to reduce foreign substances taken in through the inlet port.

In the above configuration, the bracket may have a recess opposite to the inlet port.

With this configuration, a space is present between the inlet port and the bracket, so that air is easily taken in through the inlet port. Further, by forming the bracket in this way, the rigidity of the bracket can be enhanced.

In the above configuration in which the bracket has a recess, the recess may open at right and left sides thereof.

With this configuration, air can be easily taken in from right and left sides of the inlet port.

In the above configuration, the bracket may comprise: a pair of base portions; an opposed portion disposed between the pair of base portions at a position opposite to the inlet port and spaced apart from the blower by a distance greater than that from the blower to the pair of base portions; and a pair of connecting portions connecting front and rear ends of the opposed portion respectively to the pair of base portions, wherein each of the connecting portions consists of a wall and extends outward in the lateral direction beyond a region where the inlet port is located.

With this configuration, the connecting portions consisting of walls can serve to prevent foreign substances from entering into the inlet port from front and rear directions.

In the above configuration, the bracket may comprise: a pair of base portions; an opposed portion disposed between the pair of base portions at a position opposite to the inlet port and spaced apart from the blower by a distance greater than that from the blower to the pair of base portions; a pair of connecting portions connecting the opposed portion and the pair of base portions; and attachment portions to which the blower is fixed, each of the attachment portions being provided to protrude from the base portion toward the blower, wherein the base portions are spaced apart from the blower.

With this configuration, the distance between the blower and each of the base portions can be increased, so that air can be more easily taken in from the inlet port.

In the above configuration in which the recess opens at right and left sides thereof, the seat body may comprise a pair of side frames laterally spaced apart from each other, and a connecting member connecting the pair of side frames, wherein at least a part of the connecting member is disposed in the recess.

With this configuration, the connecting member disposed in the recess can serve to suppress entering of large-sized foreign substances into the inlet port.

In the above configuration, the seat body may comprise a pair of side frames laterally spaced apart from each other, and a pan frame connecting the pair of side frames at a front side, wherein the bracket is attached to the pan frame.

In the above configuration, the bracket may have a through-opening formed in a portion opposite to the inlet port.

With this configuration, air can be easily taken in through the through-opening.

In cases where the above vehicle seat is equipped with a bracket used to fix the blower to the seat body, the bracket may be made of plastic and comprise a base portion to which the blower is fixed, and a first wall protruding from the base portion in a direction away from the occupant's side and at least partly surrounding the blower.

With this configuration, the blower can be protected by the first wall. Further, since the bracket is made of plastic, the weight of the bracket can be reduced.

In the above configuration, the bracket may comprise a second wall protruding from the base portion toward the occupant's side, and the base portion may have an opening corresponding to the inlet port.

With this configuration, air can be taken in from the occupant's side of the base portion through the opening and the inlet port. Further, if a bracket is disposed on the seat cushion for instance, at least partly providing the second wall around the opening makes it possible to reduce foreign substances entering into the inlet port.

In the above configuration, the bracket may have a hole used to fix a harness member.

With this configuration, the harness member can be easily fixed to the bracket. Further, since the bracket to which the harness member is to be fixed is made of plastic, breaking of the harness member can be suppressed even if the harness member is rubbing against the bracket.

In the above configuration, the bracket may comprise a first boss, a second boss, and a third boss, to which fastening members engageable with the blower are fastened to fix the blower, and wherein the blower comprises: a circular first engagement hole configured to be fitted onto the first boss to position the blower; an oblong second engagement hole configured to be engageable with the second boss to position the blower in a direction orthogonal to a longitudinal direction; and a third engagement hole engageable with the third boss with a play.

With this configuration, the blower can be positioned against the bracket by the first boss and the first engagement hole, and the orientation of the blower relative to the bracket can be determined by the second boss and the second engagement hole. Further, since the second engagement hole is an oblong hole and the third engagement hole is engageable with the third boss with a play, the blower can be easily assembled in the correct position even if positions of the blower relative to the bosses are inaccurate due to manufacturing error.

Advantageous Effects of Invention

According to the present invention, since the inlet port is directed toward the seat body, foreign substances (e.g., dust) are unlikely to be taken in through the inlet port.

According to the present invention, the bracket disposed therein can serve to reduce foreign substances taken in through the inlet port.

According to the present invention, since the bracket has a recess, air can be easily taken in through the inlet port and the rigidity for attachment of the bracket can be enhanced as well.

According to the present invention, since the recess opens at right and left sides thereof, air can be easily taken in from the right and left sides of the inlet port.

According to the present invention, providing the connecting portions on the bracket can serve to prevent foreign substances from entering into the inlet port from front and rear directions.

According to the present invention, since the base portions of the bracket are spaced apart from the inlet port, air can be more easily taken in from the inlet port.

According to the present invention, since the connecting member is disposed in the recess of the bracket, foreign substances are unlikely to be taken in through the inlet port.

According to the present invention, since the through-opening is formed in the bracket, air can be easily taken in through the through-opening.

According to the present invention, the blower can be protected by the first wall. Further, since the bracket is made of plastic, the weight of the bracket can be reduced.

According to the present invention, air can be taken in from the occupant's side of the base portion through the hole and the inlet port. Further, if a bracket is disposed on the seat cushion for instance, at least partly providing the second wall around the hole makes it possible to reduce foreign substances entering into the inlet port.

According to the present invention, the harness member can be easily fixed to the bracket. Further, since the bracket to which the harness member is to be fixed is made of plastic, breaking of a harness member can be suppressed even if the harness member is rubbing against the bracket.

According to the present invention, the position and the orientation of the blower can be easily determined, and even if positions of the blower relative to the bosses are inaccurate due to manufacturing error, the blower can be easily assembled in the correct position.

DESCRIPTION OF EMBODIMENTS

Next, a first embodiment of the present invention will be described in detail with reference to the accompanying drawings where necessary. In the following description, the overall structure of a car seat S as an example of a vehicle seat will be briefly described first, and then characterizing features of the present invention will be described in detail.

Figure 1:
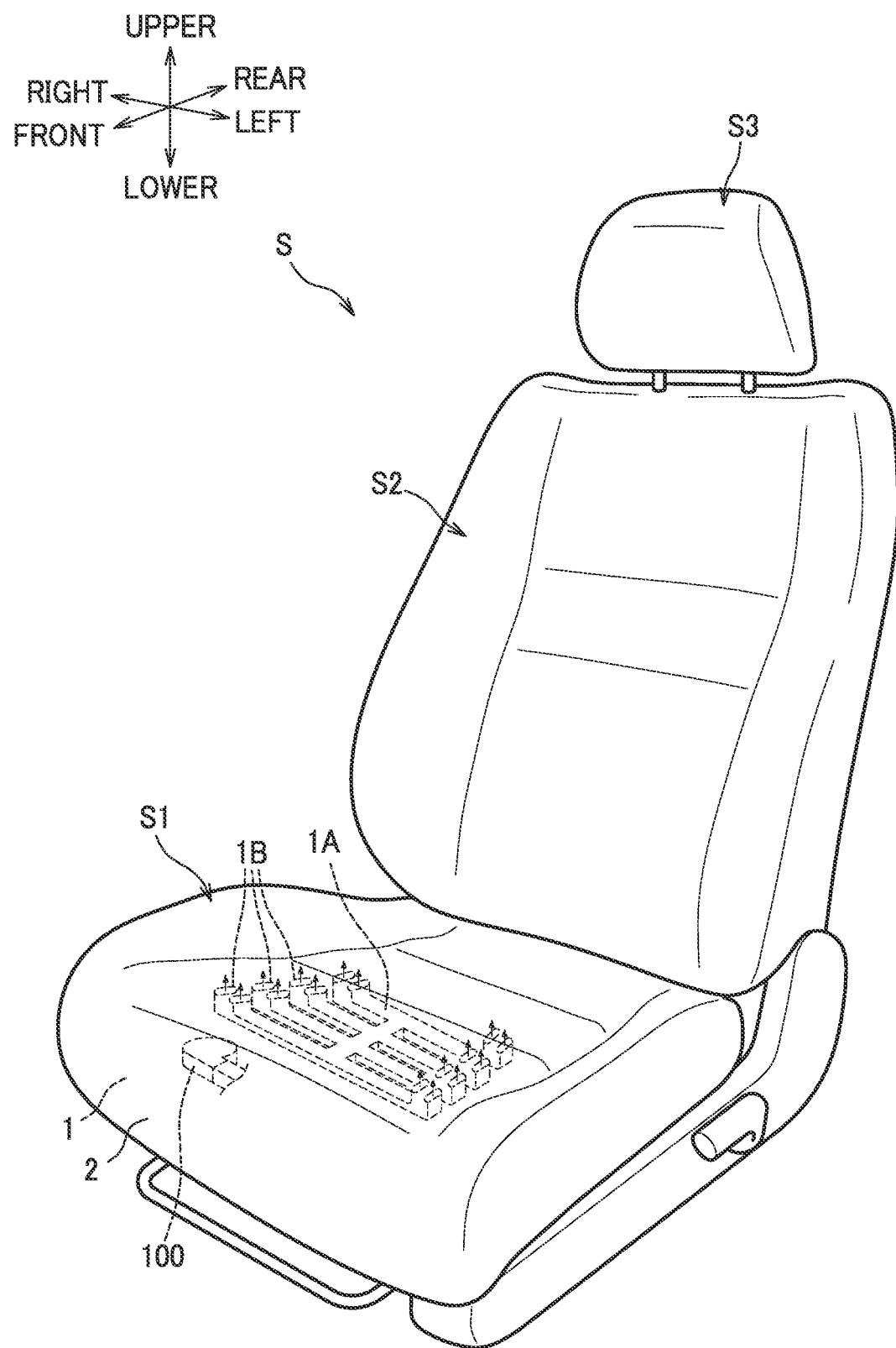
FIG. 1 is a perspective view of a car seat according to the first embodiment.

As seen in FIG. 1, the car seat S is a seat for use as a driver's seat of an automobile, and mainly includes a seat cushion S1 as an example of a seat body, a seat back S2, and a headrest S3. In the following description, the front/rear (frontward/rearward), right/left (lateral), and upper/lower (vertical) directions are designated as from the view point of an occupant seated on the car seat S.

Figure 2:
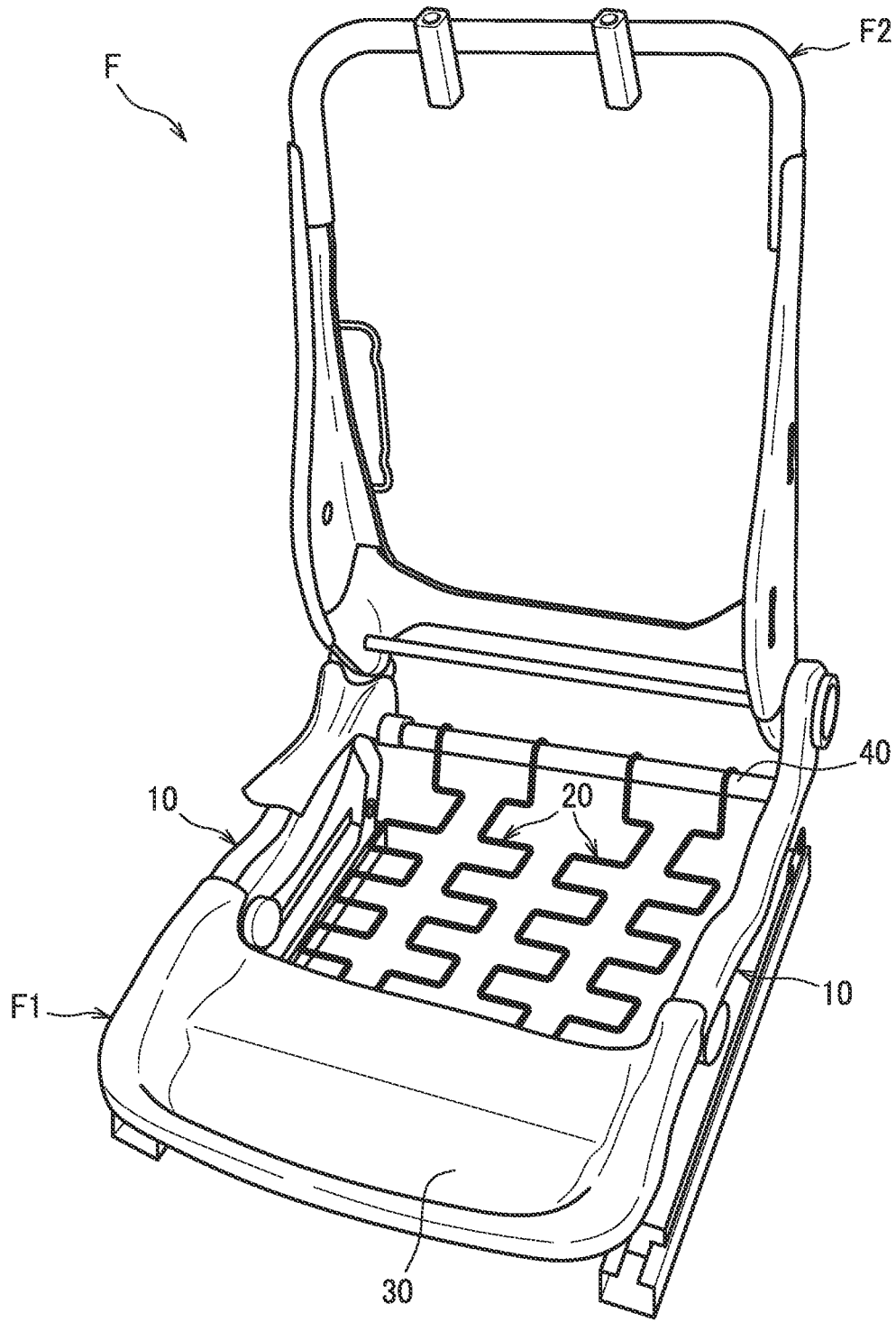
FIG. 2 is a perspective view of a seat frame embedded in the car seat.

A seat frame F as seen in FIG. 2 is embedded in the seat cushion S1 and the seat back S2. The seat frame F mainly includes a seat cushion frame F1 constituting a frame of the seat cushion S1, and a seat back frame F2 constituting a frame of the seat back S2.

The seat cushion S1 is configured, as seen in FIG. 1, such that the seat cushion frame F1 is covered with a seat cushion pad 1 made of a cushion material such as urethane foam, and a skin material 2 made of synthetic leather or fabric.

The seat cushion frame F1 as seen in FIG. 2 mainly includes a pair of right and left side frames 10, a pan frame 30 configured to connect front portions of the side frames 10, and connecting pipes 40 (see also FIG. 3) as an example of cylindrical connecting members, each of which connecting pipes 40 is configured to connect front portions or rear portions of the side frames 10.

The right and left side frames 10 are frames extending in the front-rear direction and made of metal; the right and left side frames 10 are laterally spaced apart from each other. The pan frame 30 is made by press-forming sheet metal and has a central portion that is recessed downward.

Four S-shaped springs 20 are provided to bridge between the pan frame 30 and the rear-side connecting pipe 40. The S-shaped springs 20 are each formed as a long spring extending in the front-rear direction with a plurality of turns made in the lateral direction.

The seat cushion pad 1 as seen in FIG. 1 has an air passage 1A formed in the seat cushion pad 1, and a plurality of air feeding ports 1B formed in the upper surface of the seat cushion pad 1, and is configured such that air fed from a blower 100 into the air passage 1A can be supplied through the air feeding ports 1B toward an occupant as shown by arrows.

Figure 3:
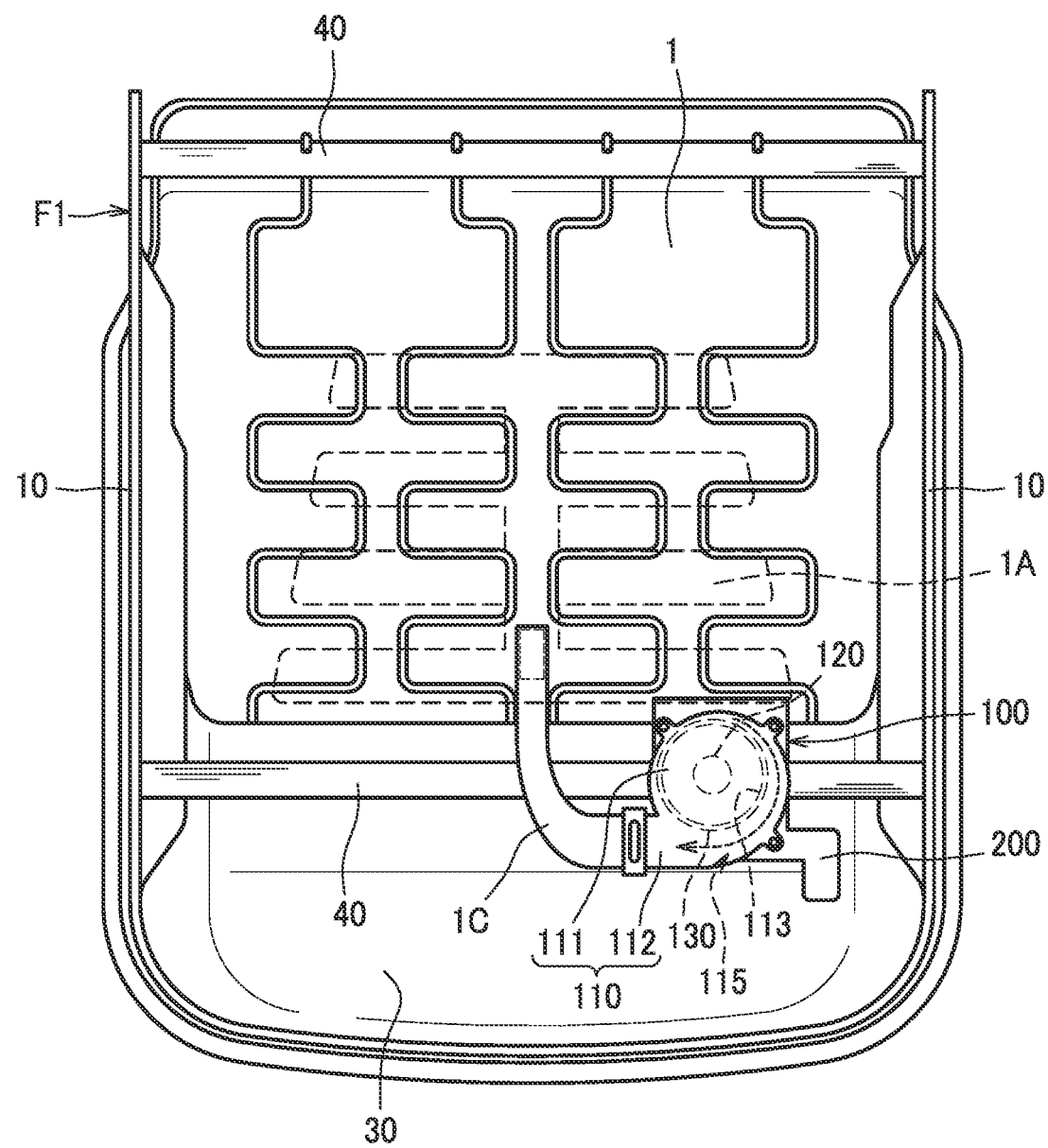
FIG. 3 is a view of a seat cushion frame and a seat cushion pad as viewed from below.

Further, as seen in FIG. 3, the blower 100 and a bracket 200 are provided under the pan frame 30, namely on the opposite side of the seat cushion pad 1 from the occupant.

The blower 100 is an air blowing device for feeding air through the duct 1C into the air passage 1A. The blower 100 includes a casing 110, a motor 120 and a fan 130.

Figure 4:
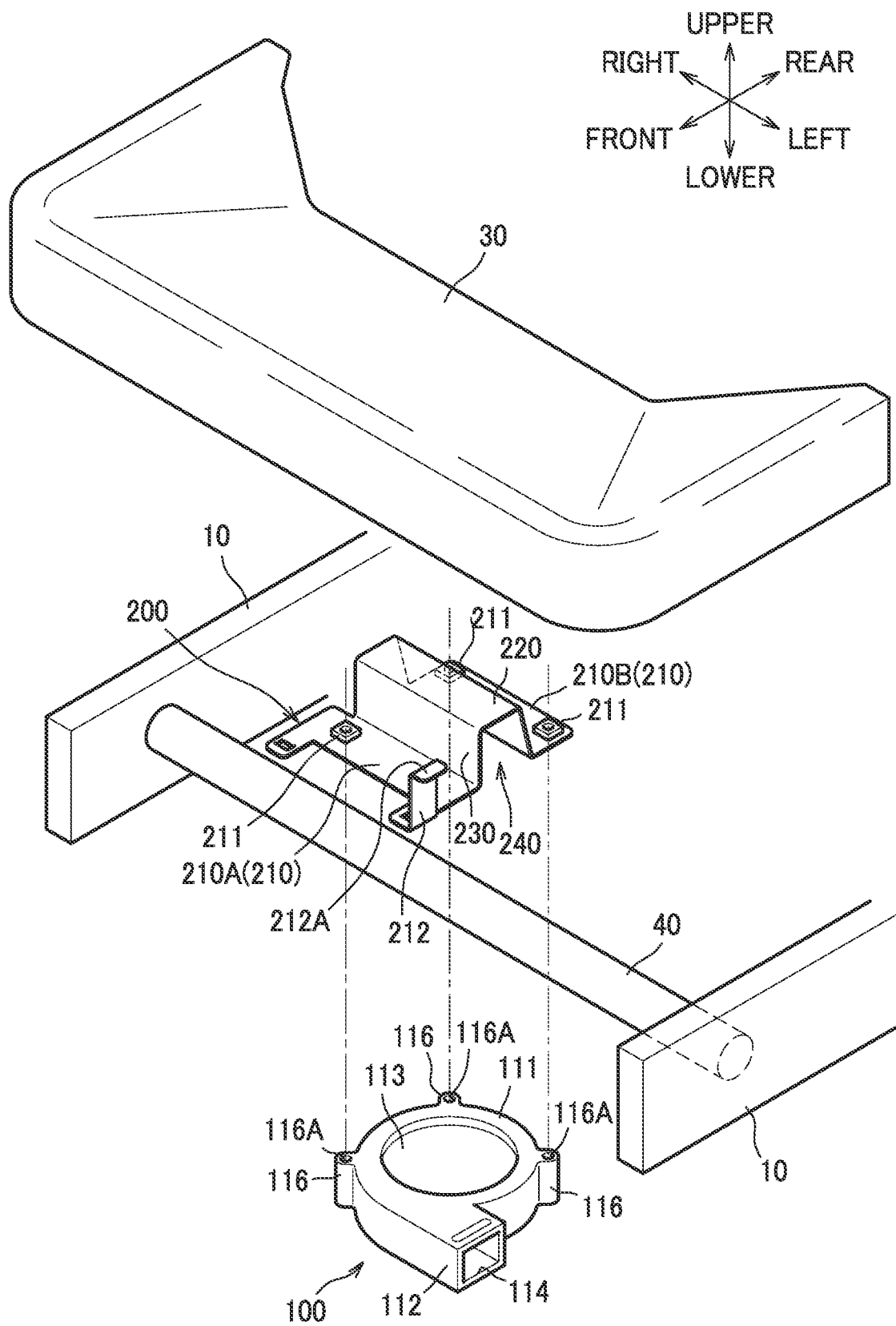
FIG. 4 is an exploded perspective view illustrating the front side of the seat cushion frame.

The casing 110 as seen in FIGS. 3 and 4 includes a cylindrical portion 111 in the form of a circular cylinder, and an outlet portion 112 protruding leftward from a front portion of the cylindrical portion 111 and connected to the duct 1C. An inlet port 113 is formed in the cylindrical portion 111, and an outlet port 114 is formed in the outlet portion 112.

The inlet port 113 is an opening for sucking air into the casing 110 by the rotation of the fan 130. The inlet port 113 is circular-shaped and formed in the upper surface of the cylindrical portion 111 so as to face upward (toward the pan frame 30).

The inlet port 113 as seen in FIG. 3 is formed in the upper surface of the cylindrical portion 111 at a position slightly shifted leftward. To be more specific, the inlet port 113 is located in such a position that the distance between the inner periphery of the cylindrical portion 111 and the outer periphery of the fan 130 gradually increases with increasing distance from a starting point that is at a center left side of the cylindrical portion 111 toward the downstream side in the clockwise direction of the figure. By this arrangement, an air flowing passage 115 through which air discharged from the fan 130 flows toward the outlet port 114 (outlet portion 112) widens gradually.

Further, the inlet port 113 as seen in FIG. 4 is not covered with a cover member such as a mesh-like member or a grid-like member and exposed. In other words, the inlet port 113 is formed by a single opening.

The outlet port 114 is an opening for blowing out the air that has been taken in through the inlet port 113. The outlet port 114 is formed in the left-side surface of the outlet portion 112. By this arrangement, the outlet port 114 is connected to the air passage 1A through the duct 1C.

The casing 110 has three protrusions 116 protruding from the outer peripheral surface of the cylindrical portion 111. The total three protrusions 116 are provided (i.e., one at the front right portion, and two at the rear right end portion and the rear left end portion, respectively), and each protrusion 116 has a through-opening 116A piercing through the protrusion 116 in the upper-lower direction.

As seen in FIG. 3, the motor 120 is a driving source such as a DC (Direct Current) brushless motor and configured to rotate the fan 130. The motor 120 is disposed in the casing 110.

The fan 130 is connected to the output shaft of the motor 120. The fan 130 is provided inside the casing 110, more specifically, at a position along the edge of the inlet port 113 of the casing 110. By this arrangement of the fan 130, the blower 100 is configured such that air taken in through the inlet port 113 by the rotation of the fan 130 flows in the air flowing passage 115 in the clockwise direction of the figure and reaches to the outlet port 114.

The bracket 200 is a sheet-metal member used to fix the blower 100 to the pan frame 30. The bracket 200 is located on the pan frame 30 opposite to the inlet port 113.

Figure 5:
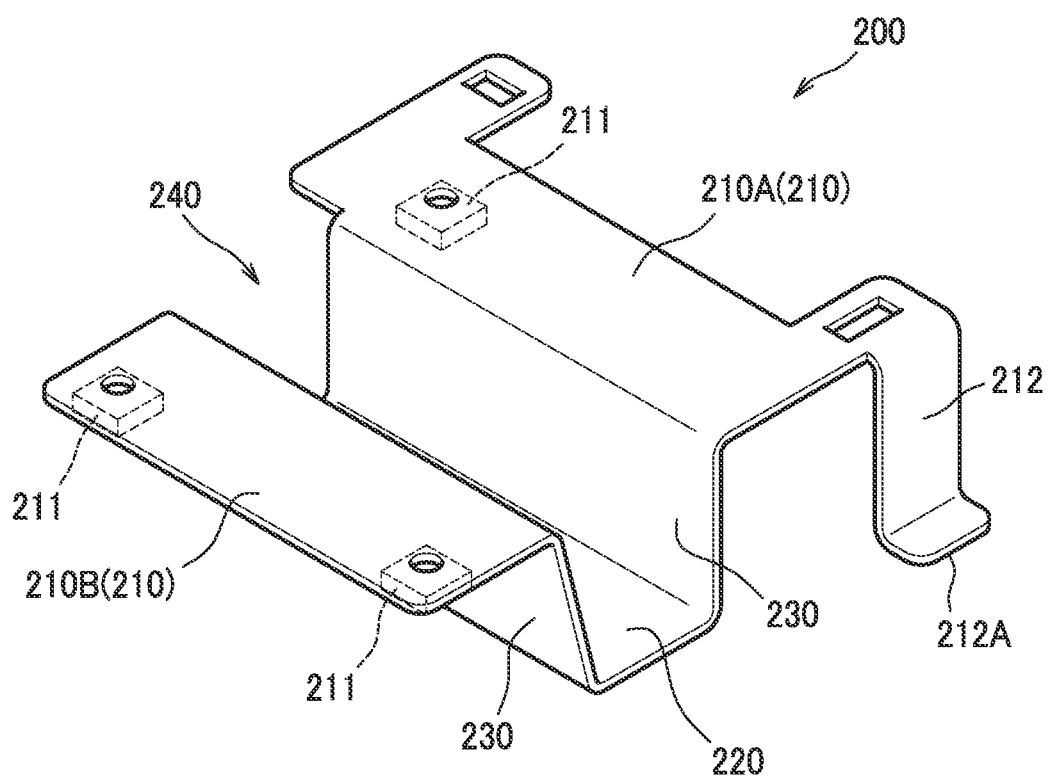
FIG. 5 is a perspective view of a bracket as viewed from below.

The bracket 200 as seen in FIGS. 4 and 5 includes a pair of base portions 210 disposed at positions corresponding to front and rear end portions of the inlet port 113, an opposed portion 220 disposed between the pair of base portions 210 at a position opposite to the inlet port 113, and connecting portions 230 disposed between the opposed portion 220 and the pair of base portions 210.

Weld nuts 211 for fixing the blower 100 are provided on the pair of base portions 210; the total three weld nuts 211 are provided (i.e., one at the front-side base portion 210A, and two at the rear-side base portion 210B). The weld nuts 211 are located on the upper surfaces of the base portions 210 at positions corresponding to the protrusions 116 of the blower 100. This makes it possible to fix the blower 100 to the lower surfaces of the base portions 210 of the bracket 200 by inserting bolts through the holes 116A of the protrusions 116 and into the weld nuts 211.

An upwardly protruding extension portion 212 is provided at the front left end of the front-side base portion 210A. The extension portion 212 is bent at its upper end to the left to provide a bent portion 212A.

Figure 6:
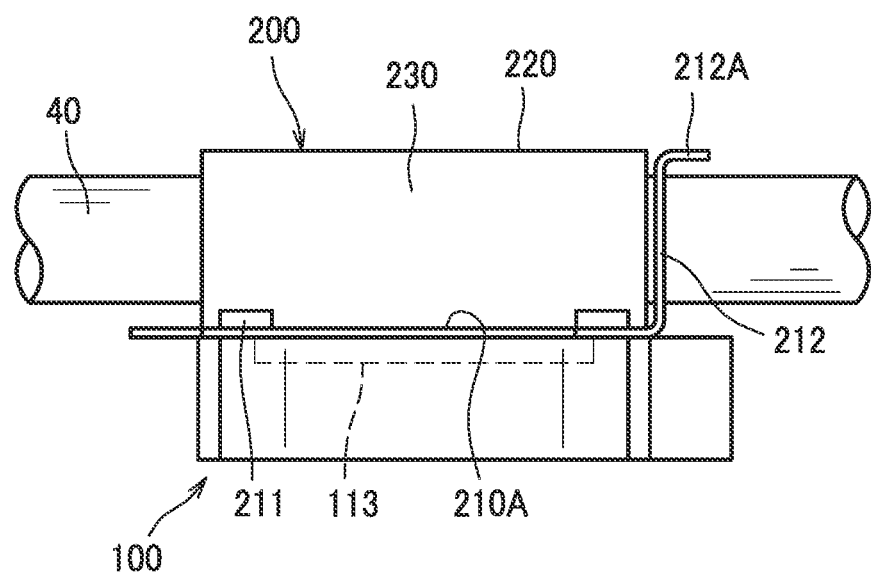
FIG. 6 includes (a) a view of the bracket to which a blower has been attached, as viewed from the front side, and (b) a view of the bracket as viewed from the right side.
Figure 6:
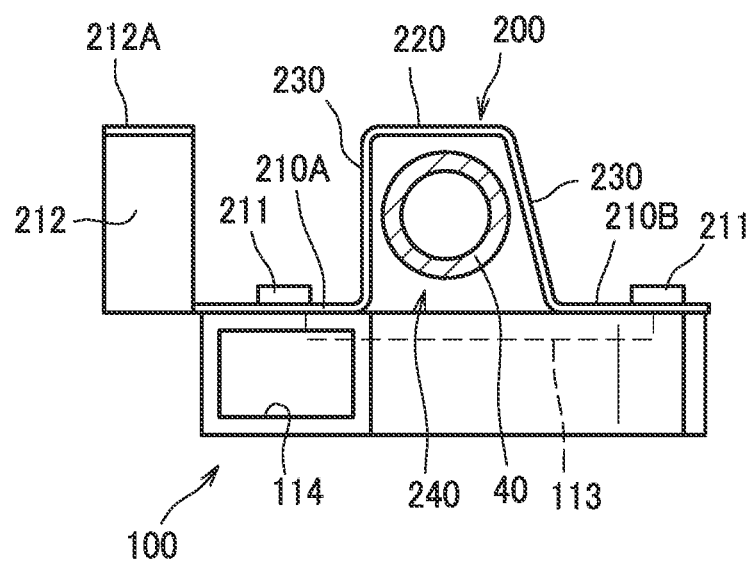

The opposed portion 220 is a portion that is fixed to the pan frame 30 by welding or other suitable means together with the above-described bent portion 212A. As seen in FIGS. 6 (a) and (b), the opposed portion 220 is located at a position spaced apart from the blower 100 by a distance greater than that from the blower 100 to the pair of base portions 210 so that the vertical position of the opposed portion 220 is substantially the same as that of the bent portion 212.

The pair of connecting portions 230 are walls configured to connect front and rear ends of the opposed portion 220 respectively to the pair of base portions 210. The pair of connecting portions 230 are raised from the base portions 210 to extend outward in the lateral direction beyond the region where the inlet port 113 is located. With this configuration, even if foreign substances come from the front-rear direction toward the inlet port 113, the connecting portions 230 can block the foreign substances.

Further, a recess 240 that is recessed upward is defined in the bracket 200 by the above-described opposed portion 220 and connecting portions 230. Accordingly, a space is formed between the inlet port 113 and the bracket 200.

The recess 240 opens laterally at right and left sides thereof. The recess 240 is located at a position where a part of the front-side connecting pipe 40 is disposed in the recess 240. With this arrangement, the connecting pipe 40 is disposed within a space above the inlet port 113 and a flow passage within the recess 240 is narrowed to a moderate extent, so that large-sized foreign substances coming from the lateral direction are blocked by the connecting pipe 40.

Next, the manner of attachment of the blower 100 and the bracket 200 will be described.

The upper surface of the opposed portion 220 and the bent portion 212A of the bracket 200 are fixed to the pan frame 30 by welding or other suitable means. After the bracket 200 is fixed to the pan frame 30, the pan frame 30 is positioned on the side frames 10 such that the front-side connecting pipe 40 is put to enter into the space of the recess 240. Thereafter, bolts are inserted through the holes 116A formed in the protrusions 116 of the blower 100 and into the weld nuts 211 of the bracket 200 to fix the blower 100 to the bracket 200.

Operation and advantageous effects of the car seat S configured as described above will be described.

When the fan 130 provided in the blower 100 rotates, air is taken in through the inlet port 113 into the blower 100, and the air flows through the air flowing passage 115 and reaches the outlet port 114. Thereafter, the air is fed into the air passage 1A and blown from the air feeding ports 1B. If the inlet port of the blower is directed downward like the conventional design, the blower is likely to take in dust on the floor of the car.

In contrast to this arrangement, according to this embodiment, since the inlet port 113 of the blower 100 is directed upward, dust and other foreign substances are unlikely to be taken in through the inlet port 113. Further, since the inlet port 113 and the bracket 200 are disposed oppositely, foreign substances taken in through the inlet port 113 can be reduced.

Further, since a space is present between the inlet port 113 and the bracket 200, air is easily taken in through the inlet port 113. Further, since the bracket 200 has the recess 240, the rigidity of the bracket 200 can be enhanced.

Further, since the recess 240 opens laterally at right and left sides thereof, air can be easily taken in from laterally outer sides of the inlet port 113.

Since the connecting portions 230 block foreign substances coming from front and rear directions, foreign substances taken in through the inlet port 113 from the front and rear directions can be reduced.

Since the connecting pipe 40 can block foreign substances coming from right and left directions, large-sized foreign substances taken in through the inlet port 113 from the right and left directions can be reduced.

According to this embodiment, the inlet port 113 is left uncovered. However, since the inlet port 113 is directed upward and configured such that foreign substances coming from front, rear, right and left directions can be blocked, foreign substances taken in through the inlet port 113 can be reduced even if a cover member is not provided separately.

Figure 7:
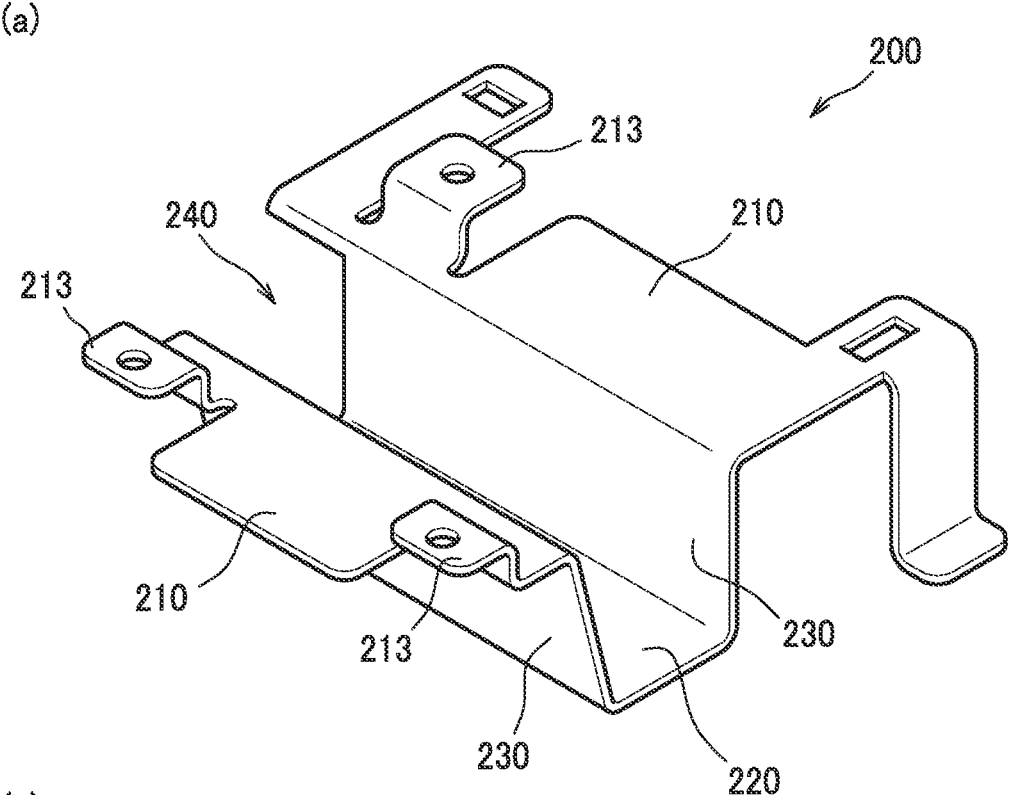
FIG. 7 includes (a) a perspective view of the bracket according to the first modification, as viewed from below, and (b) a view of the bracket to which the blower has been attached, as viewed from the right side.
Figure 7:
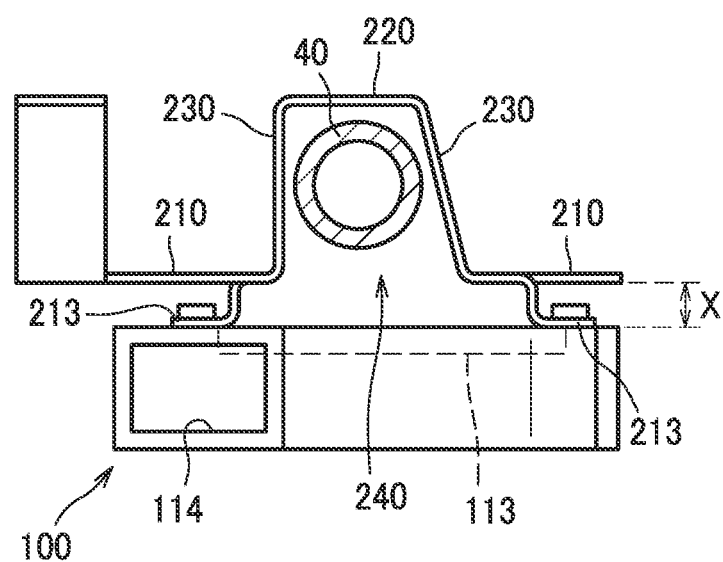

According to the first embodiment, the blower 100 is fixed to the lower surfaces of the base portions 210. However, the present invention is not limited to this specific configuration. For example, as seen in FIGS. 7 (a) and (b), the base portions 210 may be spaced apart from the blower 100.

The bracket 200 according to this configuration includes attachment portions 213 protruding from the pair of base portions 210 used to fix the blower 100; in total, three attachment portions are provided one at the front side and two at the rear side. The front-side attachment portion 213 protrudes upward from the base portion 210 and is bent frontward, whereas each of the rear-side attachment portions 213 protrudes upward from the base portion 210 and is bent rearward. The attachment portions 213 are configured such that their bent portions are disposed in positions corresponding to the positions of the protrusions 116 of the blower 100.

Once the blower 100 is attached to the attachment portions 213 configured as described above, the blower 100 is spaced apart from the base portion 210. This makes it possible to increase the distance X between the blower 100 and the base portions 210, so that air can be more easily taken in from the inlet port 113.

Figure 8:
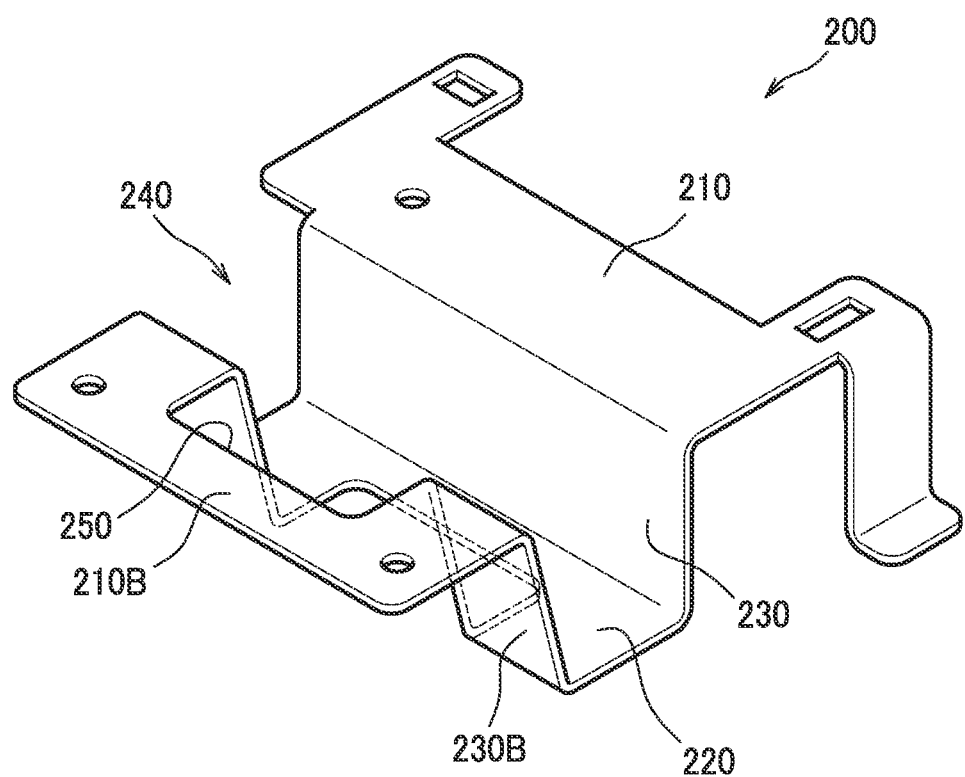
FIG. 8 is a perspective view of the bracket according to the second modification, as viewed from below.

Further, as seen in FIG. 8, the bracket 200 may have a through-opening 250 formed in a portion opposite to the inlet port 113.

The through-opening 250 according to this configuration is formed in the bracket 200 at a rear side of a portion of the bracket 200 that is opposite to the inlet port 113. To be more specific, the through-hole 250 is formed in the bracket 200 to extend from a center portion of the opposed portion 220 in the front-rear direction to a center portion of the rear-side base portion 210B in the front-rear direction across the rear-side connecting portion 230B. The through-opening 250 may be of any shape. Further, a plurality of through-openings 250 may be provided.

With this configuration, air can be easily taken in through the through-opening 250 into the inlet port 113.

The second embodiment of the present invention will be described. In the following description, parts similar to those previously described in the above embodiment are denoted by the same reference numerals and detailed description thereof will be omitted.

Figure 9:
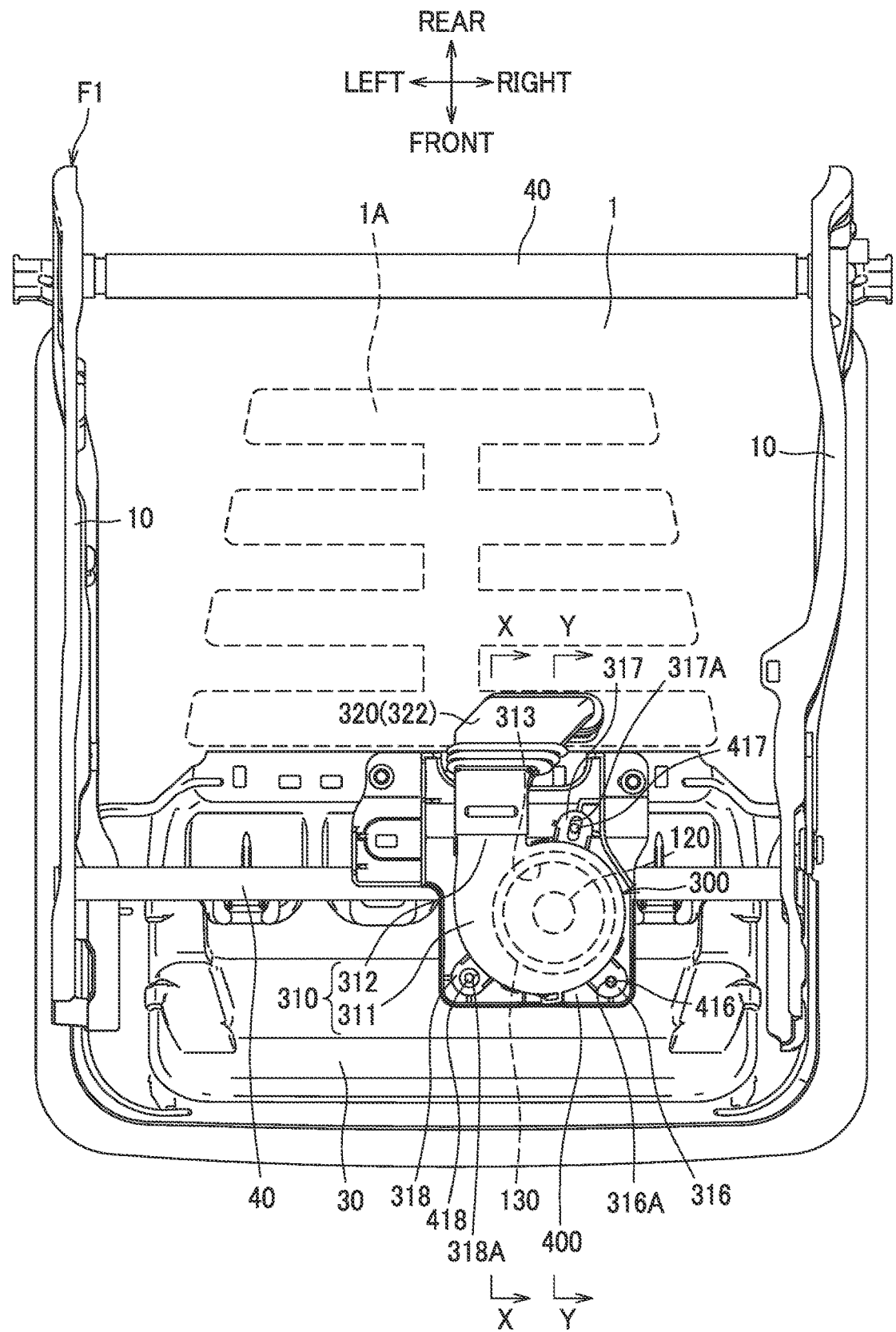
FIG. 9 is a view of the seat cushion frame and the seat cushion pad according to the second embodiment, as viewed from below.

As seen in FIG. 9, the blower 300 and the bracket 400 in this configuration are disposed under the connecting pipe 40 of the pan frame 30. As with the blower 100 in the first embodiment, the blower 300 includes a casing 310, a motor 120, and a fan 130.

Figure 10:
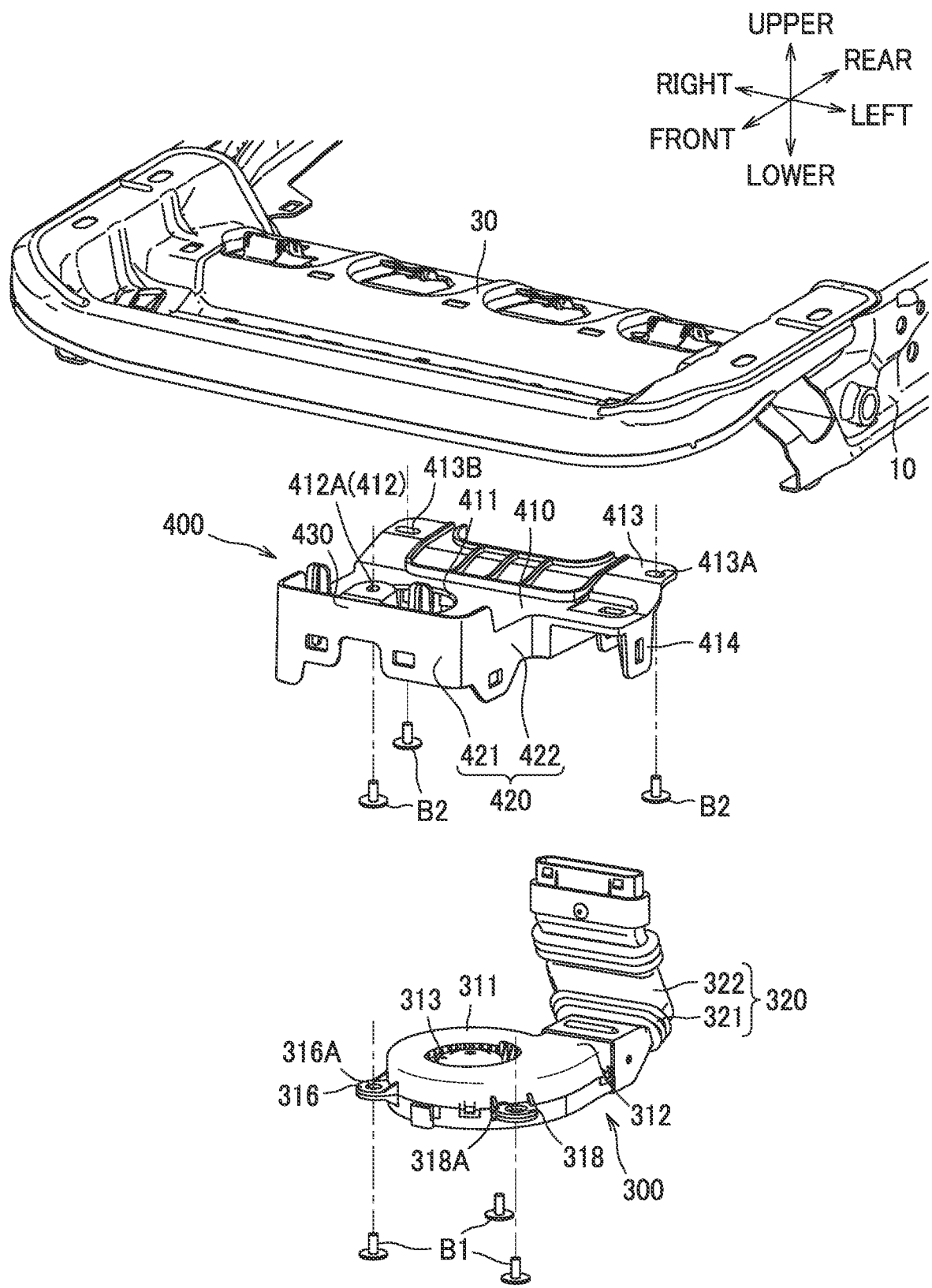
FIG. 10 is an exploded perspective view illustrating the front side of the seat cushion frame of FIG. 9.

The casing 310 is made of plastic such as PBT (polybutylene terephthalate). As with the blower 100 in the first embodiment, the casing 310 includes a cylindrical portion 311 and an outlet portion 312. As seen in FIGS. 9 and 10, an inlet port 313 is formed in the upper surface of the cylindrical portion 311. The outlet portion 312 protrudes rearward from the rear portion of the cylindrical portion 311, and an outlet port 314 is formed in the rear surface thereof (see FIG. 12 (a)). The casing 310 may be made of any material without limitation and thus may also be made of material other than PBT.

Further, outwardly protruding three attachment portions 316, 317, 318 are formed on the outer periphery of the cylindrical portion 311. The attachment portion 316 protrudes from the cylindrical portion 311 in the front right direction, the attachment portion 317 protrudes from the cylindrical portion 311 substantially rearward, and the attachment portion 318 protrudes from the cylindrical portion 311 in the front left direction. A circular-shaped first engagement hole 316A is formed in the attachment portion 316, a second engagement hole 317A in the shape of an oblong hole elongated in the front-rear direction is formed in the attachment portion 317, and a circular-shaped third engagement hole 318A that is greater than the first engagement hole 316A is formed in the attachment portion 318.

The first engagement hole 316A, the second engagement hole 317A and the third engagement hole 318A are portions through which tapping bolts B1 as an example of fastening members are inserted to fix the blower 300 to the bracket 400.

The first engagement hole 316A is configured such that it can be fitted onto a first boss 416 which will be described later to position the blower 300 in alignment with the position of the first engagement hole 316A. The second engagement hole 317A is engageable with a second boss 417 which will be described later to position the blower 300 in a direction orthogonal to the longitudinal direction of the second engagement hole 317A (i.e., substantially in the lateral direction), so that the orientation of the blower 300 can be determined. The third engagement hole 318A has a size larger than that of the first engagement hole 316A and is therefore engageable with a third boss 418 which will be described later with a play in all directions.

The duct 320 is manufactured, for example, by blow molding of olefinic elastomer (TPO). The duct 320 connects the blower 300 and the air passage 1A. The duct 320 may be made of any material without limitation and thus may also be made of material other than TPO.

Figure 12:
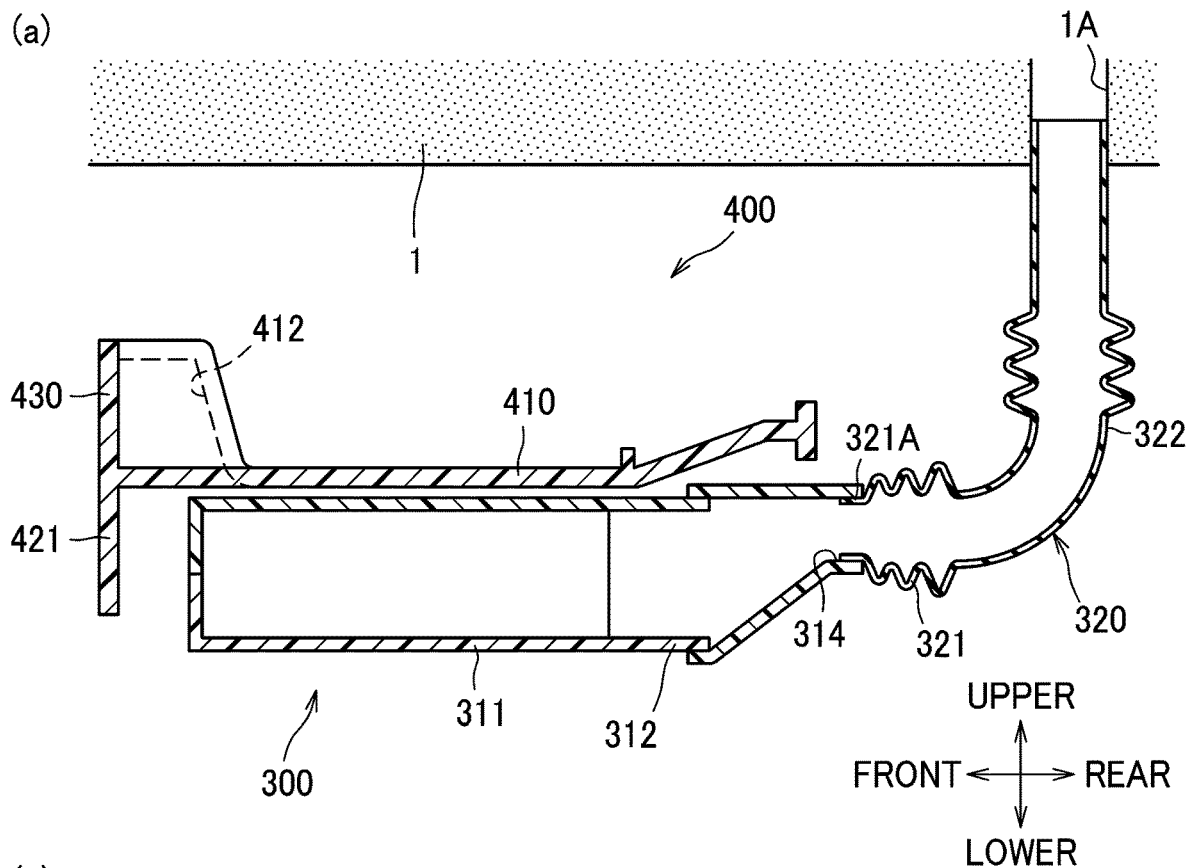
FIG. 12 includes (a) a sectional view taken along the line X-X of FIG. 9, and (b) a sectional view taken along the line Y-Y of FIG. 9.
Figure 12:
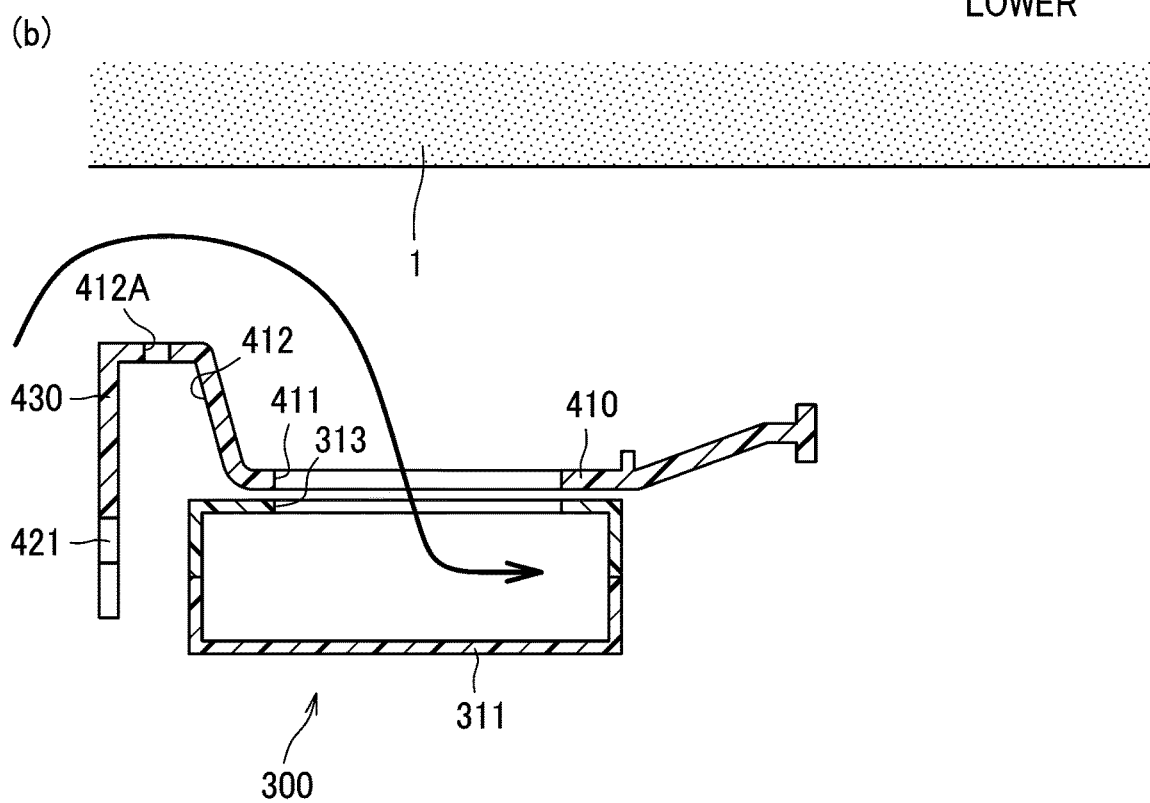

The duct 320 includes a first extension portion 321 extending in the front-rear direction, and a second extension portion 322 extending upward from the rear end of the first extension portion 322 and having an upper end connected to the air passage 1A. As seen in FIG. 12 (a), the first extension portion 321 has a front end portion that is formed as a fitting portion 321A to be fitted into the outlet port 314. By fitting the fitting portion 321A into the outlet portion 314 the outlet port 314 is in communication with the air passage 1A through the duct 320.

Figure 11:
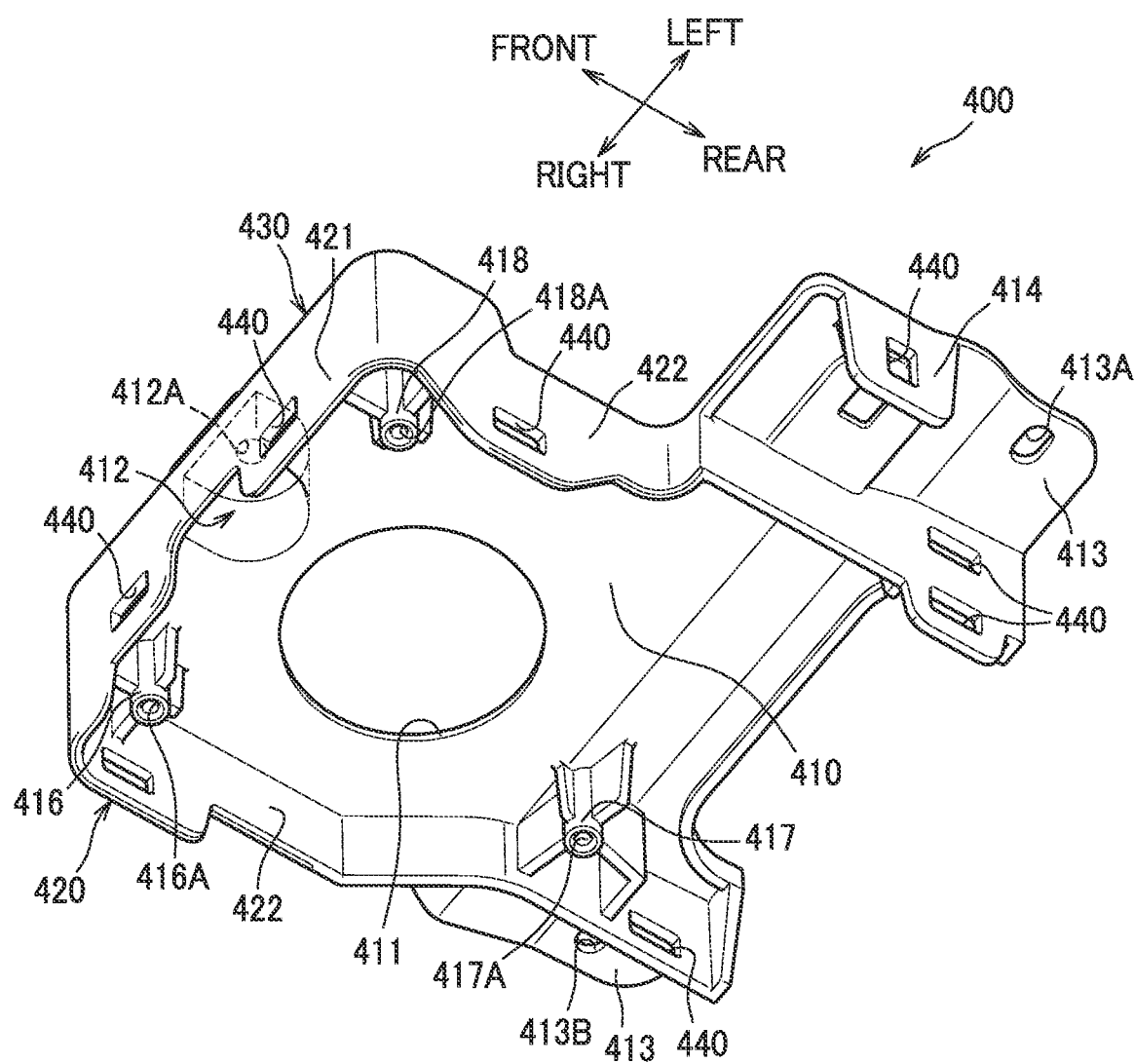
FIG. 11 is a perspective view of the bracket of FIG. 9, as viewed from below.

As seen in FIGS. 10 and 11, the bracket 400 is manufactured by injection molding of plastic such as PP (polypropylene). The bracket 400 includes a base portion 410, a first wall 420, and a second wall 430. The bracket 400 may be made of any material without limitation and thus may also be made of material other than PP.

The base portion 410 is a portion to which the blower 300 is fixed. The base portion 410 is generally rectangular in shape. A circular opening 411 is formed in the base portion 410 at a position corresponding to the position of the inlet port 313 of the blower 300 (see also FIG. 12 (b)). Provided in the front end portion of the base portion 410 at a laterally central portion thereof is a recess 412 that is recessed upward from the lower surface of the front end portion.

The first wall 420 protrudes from the base portion 410 in a direction away from the occupant's side (i.e., downward). The first wall 420 has a front wall 421 located at the front end of the base portion 410, and a pair of side walls 422 located at right and left side ends of the base portion 410.

The front wall 421 is formed to extend laterally along the whole area of the front end of the base portion 410, and the pair of side walls 422 are formed to extend in the front-rear direction from the right and left ends of the front wall 421 along the whole areas of the right and left ends of the base portion 410. The front wall 421 and the pair of side walls 422 are located around the opening 411 of the base portion 410, namely, around the blower 300.

The second wall 430 protrudes from the front end of the base portion 410 toward the occupant's side (i.e., upward). The second wall 430 is located frontward of the opening 411 (see also FIGS. 12 (a) and (b)). The second wall 430 is formed to extend laterally along the whole area of the front end of the base portion 410.

The base portion 410 has a first boss 416, a second boss 417, and a third boss 418, which protrude downward from the lower surface of the base portion 410 and are used to attach the blower 300 to the base portion 410. Each of the bosses 416, 417, 418 is cylindrical in shape, and a hole 416A, 417A, 418A with which a tapping bolt B1 is engageable is formed in the lower surface thereof. The bosses 416, 417, 418 have the same shape, and they are arranged at positions corresponding to the positions of the first engagement hole 316A, the second engagement hole 317A, and the third engagement hole 318A, respectively.

Further, the base portion 410 includes ribs (reference numerals omitted) configured to connect the outer peripheral surface of each boss 416, 417, 418 and the front wall 421 or the side wall 422. The amount of protrusion of the ribs from the base portion 410 are the same, so that when the attachment portions 316, 317, 318 of the blower 300 contact the ribs, the blower 300 can be positioned vertically.

The base portion 410 further includes a pair of fixing portions 413 at the rear end portion thereof the fixing portions 413 extend laterally outward of the side walls 422. The left-side fixing portion 413 has an extension portion 414 extending downward from the left end of the fixing portion 413.

Further, a first fixing hole 412A is formed in the bottom wall of the above-described recess 412, a second fixing hole 413A is formed in the left-side fixing portion 413, and a third fixing hole 413B is formed in the right-side fixing portion 413. The fixing holes 412A, 413A, 413B are structures through which tapping bolts B2 are inserted to fix the bracket 400 to the pan frame 30.

The first fixing hole 412A is a circular hole to be fitted onto a boss (not shown) of the pan frame 30 to position the bracket 400 in alignment with the position of the first fixing hole 412A. The second fixing hole 413A is an oblong hole elongated in the lateral direction and configured such that when it engages with a boss (not shown) of the pan frame 30, the bracket 400 can be positioned in the front-rear direction orthogonal to the longitudinal direction of the oblong hole to thereby determine the orientation of the bracket 400 relative to the seat cushion frame F1. The third fixing hole 413B is an oblong hole greater than the first fixing hole 412A and the second fixing hole 413A; the third fixing hole 413B is engageable with a boss (not shown) of the pan frame 30 with a play in all directions.

Further, holes 440 extending in the lateral direction are formed in the first wall 420 and the extension portion 414. The holes 440 are configured such that clips for supporting a harness member for the blower 300 and a harness member for other electrical equipment can be fixed.

Next, the manner of attachment of the blower 300 and the bracket 400 will be described.

As seen in FIG. 10, the fixing holes 412A, 413A, 413B of the bracket 400 are brought into engagement with the corresponding bosses of the pan frame 30, and thereafter the tapping bolts B2 are inserted into the corresponding holes of the bosses of the pan frame 30. Accordingly, the bracket 400 is fixed to the pan frame 30.

As seen in FIGS. 9 and 12 (a), the fitting portion 321A of the duct 320 is fitted into the outlet port 314 of the blower 300, and the upper end of the second extension portion 322 is inserted into the opening communicating with the air passage 1A. Thereafter, as seen in FIGS. 9 and 10, the engagement holes 316A, 317A, 318A of the blower 300 are brought into engagement with the corresponding bosses 416, 417, 418 of the bracket 400, and the tapping bolts B1 are inserted into the corresponding holes of the bosses 416, 417, 418 of the bracket 400. Accordingly, the blower 300 is attached to the bracket 400.

With the configuration as described above in this embodiment, the following advantageous effects can be obtained.

Since the first wall 420 is disposed around the blower 300, the blower 300 can be protected by the first wall 420. Further, since the bracket 400 is made of plastic, the weight of the bracket 400 can be reduced and the degree of design freedom for the bracket 400 can be improved.

Since the opening 411 is formed in a position of the base portion 410 corresponding to the position of the inlet port 313, air can be taken in from the upper side of the base portion 410 through the inlet port 313. Further, since the second wall 430 is disposed around the opening 411 (i.e., around the inlet port 313), as seen in FIG. 12 (b), the ambient air around the bracket 400 first flows upward toward the seat cushion pad 1 and then flows downward toward the inlet port 313. Namely, the ambient air around the bracket 400 gets over the second wall 430 and enters into the inlet port 313. Accordingly, the entry route for foreign substances between the bracket 400 and the seat cushion pad 1 narrows because of the presence of the second wall 430, so that foreign substances taken in through the inlet port 313 can be reduced as compared with an alternative configuration in which the second wall is not provided on the bracket.

Since the holes 440 are formed in the bracket 400, the harness member is easily fixed to the bracket 400. Further, since the bracket 400 to which the harness member is to be fixed is made of plastic, even if the harness member is rubbing against the bracket, defects of the harness member such as breaking or short-circuiting can be suppressed.

Further, fitting the first boss 416 into the first engagement hole 316A makes it possible to position the blower 300 relative to the bracket 400, and engaging the second boss 417 and the second engagement hole 317A together makes it possible to determine the orientation of the blower 300 relative to the bracket 400. Further, since the second engagement hole 317A is an oblong hole and the third engagement hole 318A is engageable with the third boss 418 with a play, the blower 300 can be easily assembled in the correct position even if positions of the bracket 400 relative to the bosses 416, 417, 418 are inaccurate due to manufacturing error.

Hereinafter, a car motor actuator 500 for driving the motor 120 of the blower 100, 300 according to the above-described first and second embodiments (only the first embodiment is shown) will be described.

Figure 13:
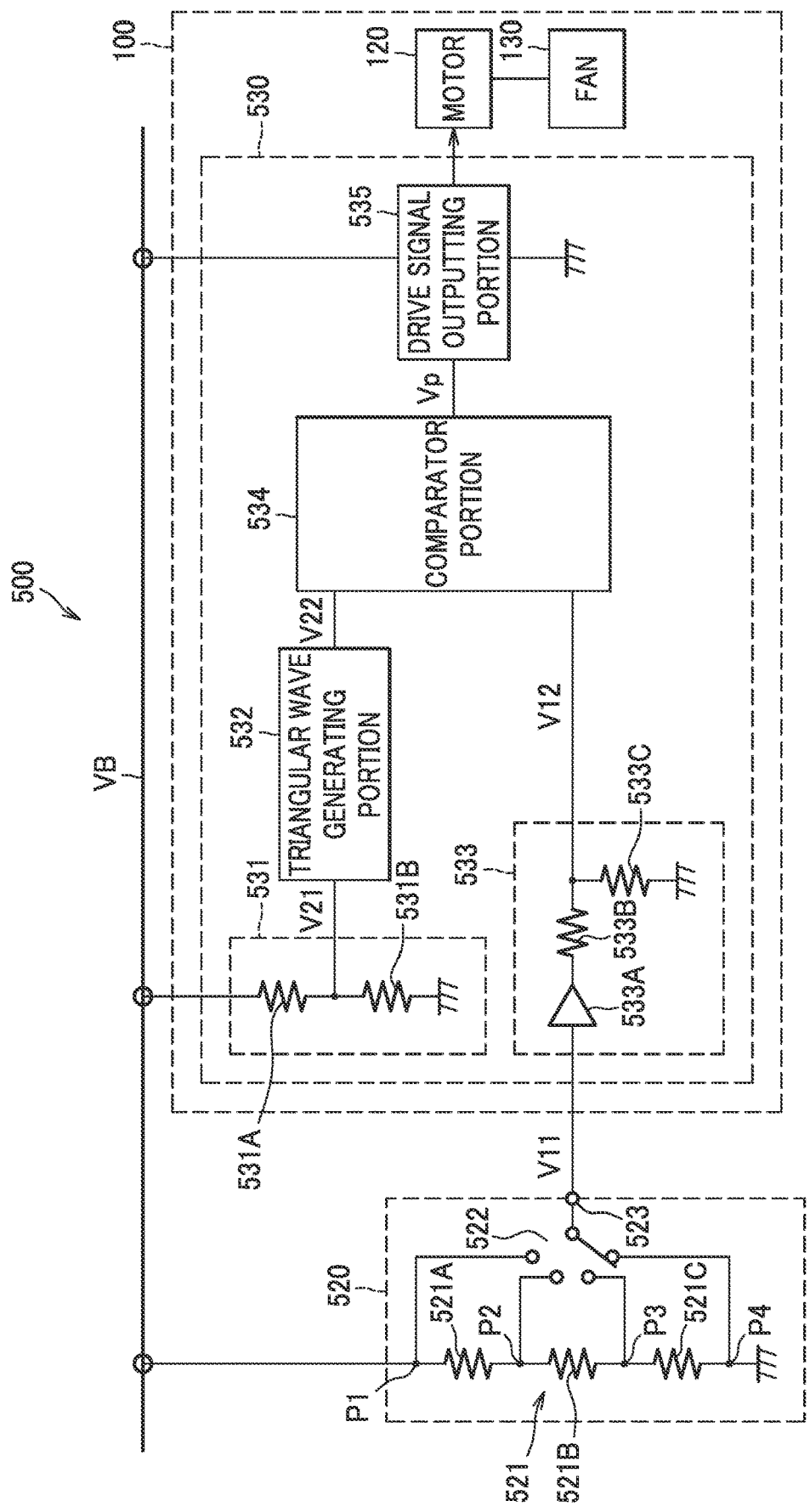
FIG. 13 is a diagram showing the configuration of a car motor actuator.

As seen in FIG. 13, a battery power source VB as an example of a power source mounted on the car supplies electric power to the car motor actuator 500. The car motor actuator 500 includes the motor 120, an input voltage generating portion 520, and a driving portion 530. The motor 120 and the driving portion 530 are provided in the blower 100.

The motor 120 is a driving source such as a DC (Direct Current) brushless motor for rotating a fan 130.

The input voltage generating portion 520 generates an input voltage V11 to be input to the driving portion 530, and includes an array of resistors 521 and a switch portion 522.

The array of resistors 521 consists of three resistors 521A, 521B, 521C provided between the battery power source VB and the ground; these resistors 521A, 521B, 521C are connected in series from the battery power source VB side in this order. The resistors 521A, 521B, 521C may be the same or different in resistance value.

The switch portion 522 allows the occupant to turn the blower 100 ON or OFF and to switch the volume of air to various levels between Hi, Mid, and Low when the blower 100 is turned ON. The switch portion 522 is configured to connect one of a contact portion P1 that is located on the battery power source VB side of the array of resistors 521, a contact portion P2 that is located between the resistor 521A and the resistor 521B, and a contact portion P3 that is located between the resistor 521B and the resistor 521C, selectively to an output portion 523 of the input voltage generating portion 520. The voltage of the contact portion selected accordingly by the switch portion 522 is output from an output portion 523 to the driving portion 530 as an input voltage V11 of the driving portion 530.

According to this embodiment, the volume of air at the blower 100 is switched to Hi-output when the switch portion 522 is connected to the contact portion P1, the volume of air at the blower 100 is switched to Mid-output when the switch portion 522 is connected to the contact portion P2, and the volume of air at the blower 100 is switched to Low-output when the switch portion 522 is connected to the contact portion P3. When the switch portion 522 is connected to the contact portion P4, the blower 100 is turned OFF.

The driving portion 530 is a portion to which the input voltage V11 is directly input from the input volume generating portion 520 to drive the motor 120 at the rotational speed corresponding to the magnitude of the input voltage V11. The driving portion 530 includes a reference voltage generating portion 531, a triangular wave generating portion 532, a buffer portion 533, a comparator portion 534, and a drive signal outputting portion 535.

The reference voltage generating portion 531 is a portion for generating a reference voltage V21, and consists of two resistors 531A, 531B that are connected in series between the battery power source VB and the ground. The reference voltage generating portion 531 is configured to output a voltage between the resistor 531A and the resistor 531B to the triangular wave generating portion 532 as a reference voltage V21. The resistors 531A, 531B may be the same or different in resistance value.

It should be noted that the input volume generating portion 520 and the reference voltage generating portion 531 as described above generate the input voltage V11 and the reference voltage V21 by dividing the voltage between the battery power source VB and the ground using the plurality of resistors that are connected in series. For this reason, if the voltage of the battery power source VB changes, the voltages of the input voltage V11 and the reference voltage V21 also change in accordance with the change in voltage of the battery power source VB.

Figure 14:
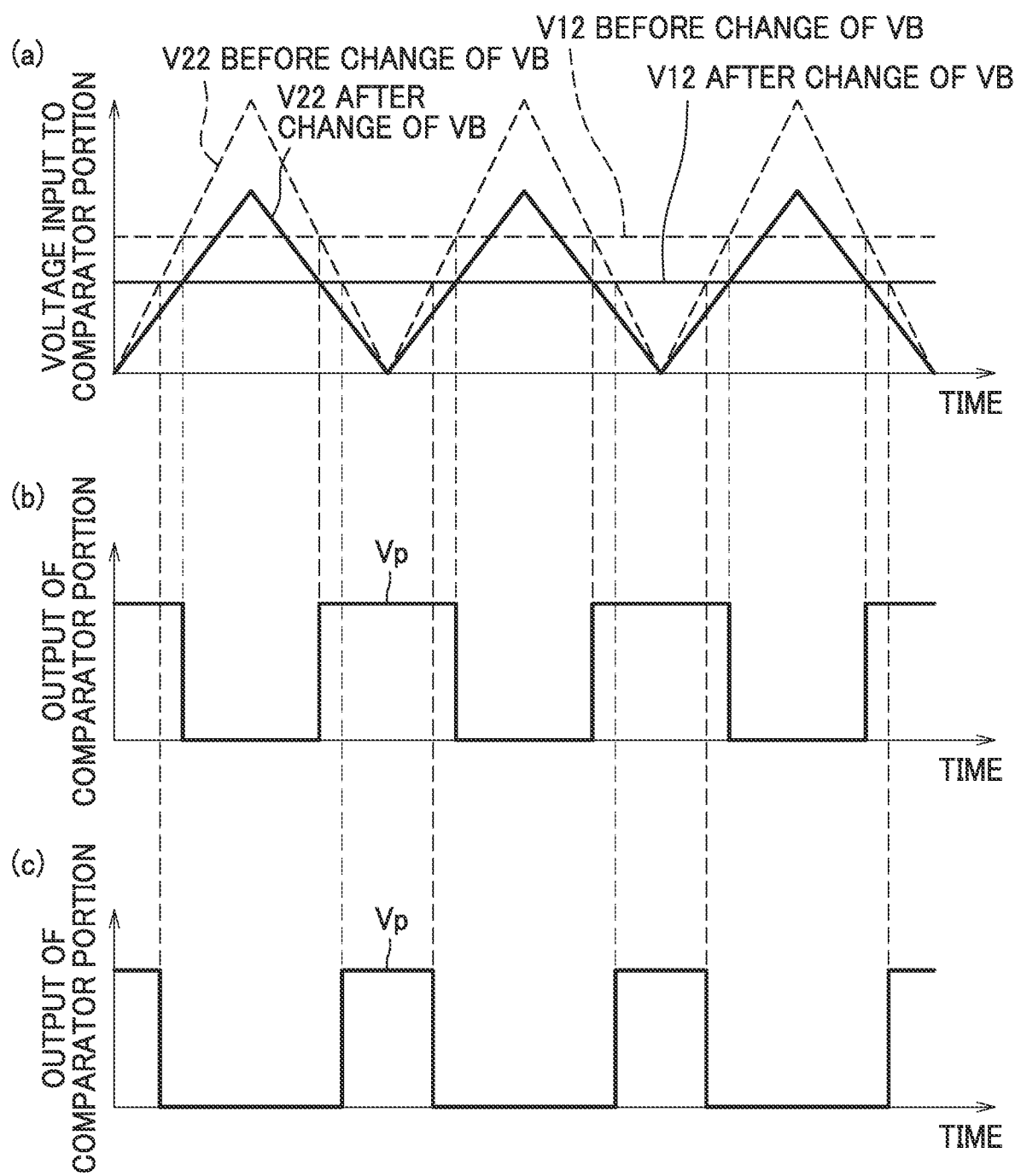
FIG. 14 includes (a) a graph showing voltage to be input to a comparator, (b) a graph showing output of the comparator, and (c) a graph showing output of the comparator according to a comparative example.

The triangular wave generating portion 532 is a portion for generating a triangular wave V22 having an amplitude corresponding to the reference voltage V21, and is configured to output the triangular wave V22 to the comparator portion 534 (see FIG. 14 (a)).

The buffer portion 533 is a portion for adjusting the input voltage V11 to a buffer voltage V12 and outputting it to the comparator portion 534. The buffer portion 533 consists of an amplifier 533A to which the input voltage V11 is input, and two resistors 533B, 533C connected in series between the output of the amplifier 533A and the ground. The buffer portion 533 is configured to output the voltage between the resistor 533B and the resistor 533C to the comparator portion 534 as the buffer voltage V12.

The comparator portion 534 is configured to compare the magnitudes of the input voltage V11 and the reference voltage V21, more specifically, the magnitudes of the buffer voltage V12 and the triangular wave V22, and to output a pulse signal Vp having a pulse width corresponding to the magnitude of the input voltage V11 to the drive signal outputting portion 535. The comparator portion 534 according to this embodiment is set to output a high voltage if it determines that the buffer voltage V12 is greater than the triangular wave V22, and to output a low voltage if it determines that the triangular wave V22 is greater than the buffer voltage V12 (see FIGS. 14 (a) and (b)). However, these outputs may be set vice versa.

The drive signal outputting portion 535 is configured to output to the motor 120 a drive signal such that the motor 120 is driven at the rotational speed corresponding to the duty cycle of the pulse signal Vp.

Operation and advantageous effects of the car motor actuator 500 configured as described above according to this embodiment will be described.

While a change of the battery power source VB does not occur, one of the contact portions of the array of resistors 521 in the input voltage generating portion 520 is selected by the switch portion 522. For example, if the contact portion P1 is selected by the switch portion 522, the input voltage V11 associated with the voltage of the contact portion P1 is input to the buffer portion 533, and as seen in FIG. 14 (a), the buffer voltage V12 (shown by broken line) is input to the comparator portion 534. The comparator portion 534 then compares the magnitudes of the buffer voltage V12 and the triangular wave V22 (shown by broken line) that have been generated from the reference voltage V21 by the triangular wave generating portion 532, and outputs a pulse signal Vp such as shown in FIG. 14 (b) to the drive signal outputting portion 535.

The motor 120 is then driven to rotate by the drive signal corresponding to the pulse signal Vp of the drive signal outputting portion 535, so that the fan 130 rotates in response thereto to feed air from the blower 100 to the air passage 1A. Further, the contact portions P2 or P3 is selected by the switch portion 522 and the comparator portion 534 outputs the pulse signal Vp having a pulse width corresponding to the input voltage V11 therefor, so that the motor 120 is driven at a rotating speed corresponding to the duty cycle of the output pulse signal Vp. In other words, switching the contact portions P1, P2, P3 with the switch portion 522 makes it possible to change the rotation speed of the motor 120 by a so-called PWM (Pulse Width Modulation) control in which the pulse width of the pulse signal Vp is controlled.

As described above, since the rotation speed of the motor 120 can be determined when the switch portion 522 switches the input voltage V11 between a plurality of stages, the volume of air at the blower 100 can be adjusted by a simple configuration using an analog circuit only. For this reason, it is not necessary to provide an ECU for performing digital control, so that the number of parts required for the car seat S and the car motor actuator 500 can be reduced.

Figure 15:
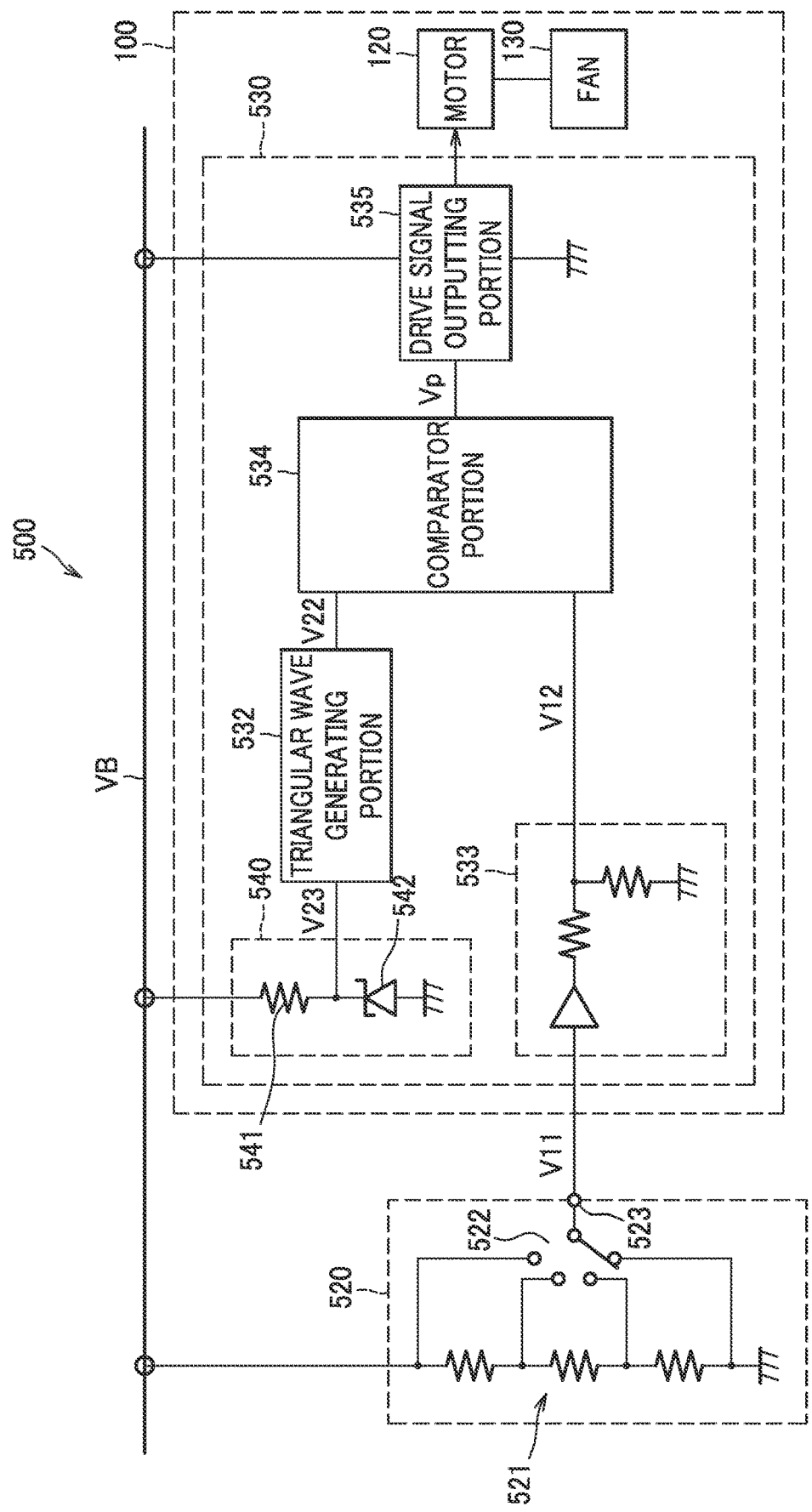
FIG. 15 is a diagram showing the configuration of the car motor actuator according to the comparative example.

The voltage of the battery power source VB lowers in accordance with use condition and the like. Therefore, for example, as seen in FIG. 15, if a standard voltage generating portion 540 is used in place of the reference voltage generating portion 531 shown in FIG. 13, the standard voltage V23 output from the standard voltage generating portion 540 is constant even if the voltage of the battery power source VB changes, so that the triangular wave V22 at the triangular wave generating portion 532 does not change before and after the change in the voltage of the battery power source VB and is kept constant (see the broken line in FIG. 14 (a)).

To be more specific, the standard voltage generating portion 540 consists of a resistor 541 having one end connected to the battery power source VB and the other end, and a Zener diode 542 having a cathode connected to the other end of the resistor 541 and an anode connected to the ground. The standard voltage generating portion 540 is configured to output a voltage in the contact point between the resistor 541 and the Zener diode 542 to the triangular wave generating portion 532 as a standard voltage V23. The standard voltage generating portion 540 as described above is configured to output the standard voltage V23 having a constant value by the use of a so-called Zener effect (i.e., the voltage equal to or greater than the Zener voltage is applied to the cathode of the Zener diode 542, so that even if the battery power source VB changes in voltage, an electric current flows from the cathode toward the anode).

Herein, even if the triangular wave V22 is constant, the input voltage V11 changes in accordance with a change in voltage of the battery power source VB, so that the buffer voltage V12 lowers accordingly (see the solid line in FIG. 14 (a)). Consequently, as seen in FIG. 14 (c), the comparator portion 534 outputs a pulse signal Vp having a pulse width smaller than the pulse width of FIG. 14 (b), with the result that the rotation speed of the motor 120 lowers and even if the volume of air at the blower 100 is set to Hi-output, the obtained volume of air is smaller than the expected volume.

In contrast, according to this embodiment, when the voltage of the battery power source VB changes, the input voltage V11 and the reference voltage V21 change in accordance with the change in voltage of the battery power source VB. Therefore, the buffer voltage V12 and the triangular wave V22 change from the state indicated by the broken line to the state indicated by the solid line as shown in FIG. 14 (a). At this time, as shown in FIG. 14 (b), the output of the comparator portion 534 is substantially the same as that obtained before the change of the battery power source VB. This can suppress adverse effects of the change in voltage of the battery power source VB, so that adverse effects on the rotation speed of the motor 120 due to the change in voltage of the battery power source VB can be minimized.

Although one embodiment of the car motor actuator 500 has been described above, the specific configuration of the car motor actuator 500 may be modified where appropriate.

Figure 16:
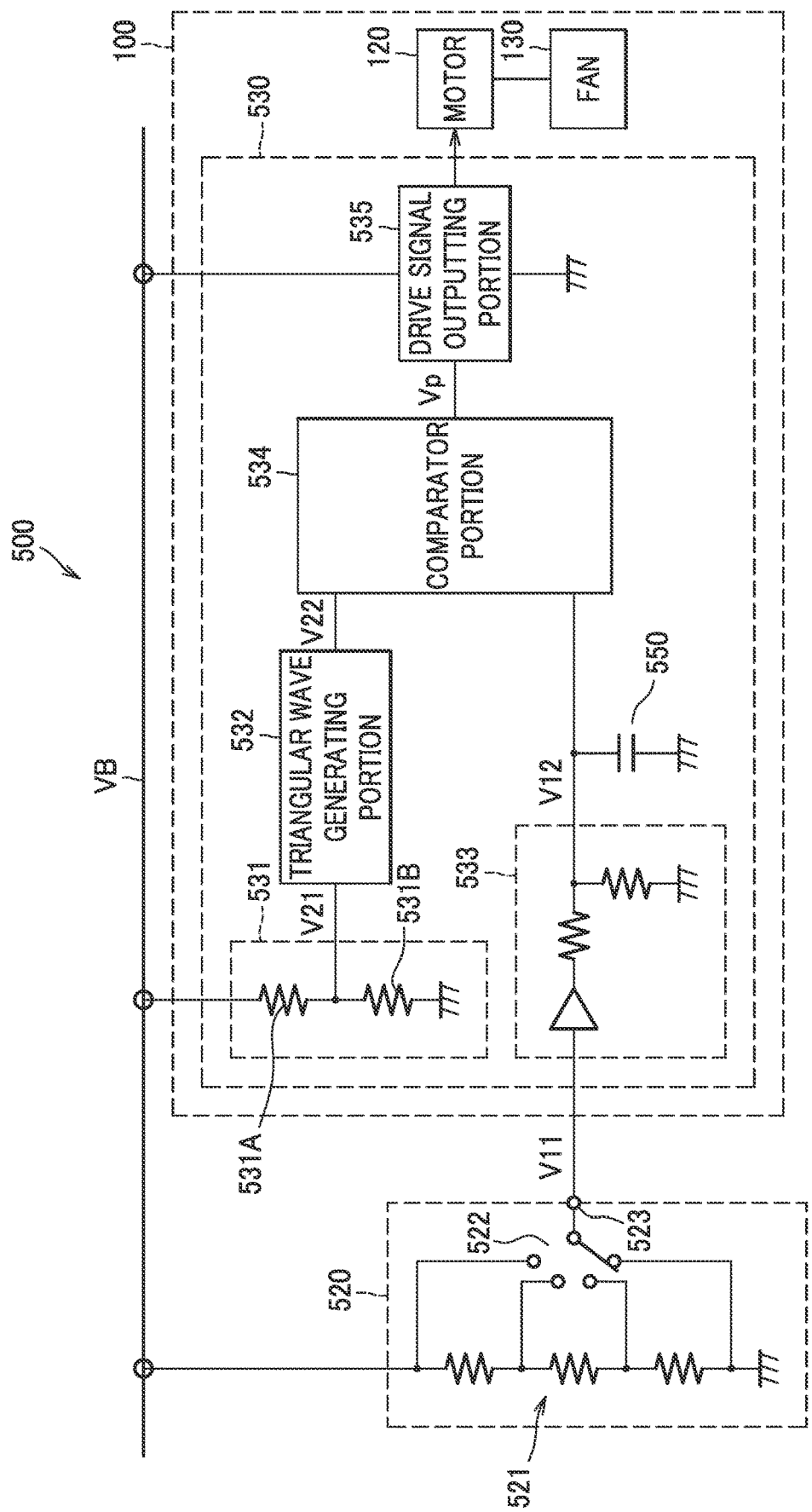
FIG. 16 is a diagram showing the configuration of the car motor actuator according to a modification.

Although the buffer voltage V12 from the buffer portion 533 is directly input to the comparator portion 534 in the above-described embodiment, a capacitor 550 may be provided between the buffer portion 533 and the comparator portion 534 as seen in FIG. 16.

To be more specific, the capacitor 550 has one end connected between the buffer portion 533 and the comparator portion 534 and the other end connected to the ground. As long as the one end of the capacitor 550 is connected between the input voltage generating portion 520 and the comparator portion 534, the one end may be connected, for example, between the input voltage generating portion 520 and the buffer portion 533.

Figure 17:
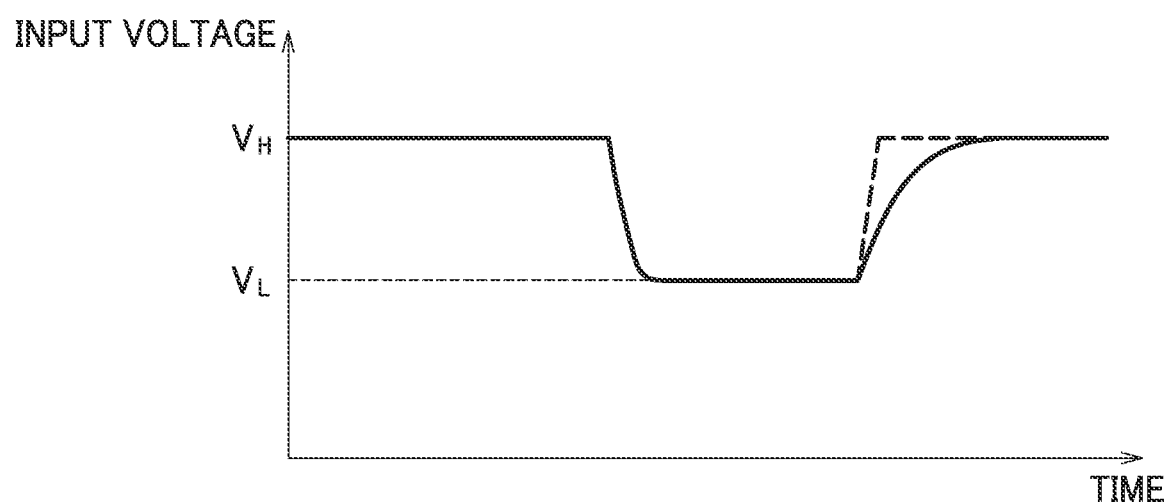
FIG. 17 is a graph showing a change in the input voltage when the volume of air supplied by the blower according to the modification is switched between Hi and Low.

For example, when the rotation speed of the motor 120 is low as a result of switching the volume of air at the blower 100 from Hi-output to Low-output by the switch portion 522 of the input voltage generating portion 520, if the volume of air at the blower 100 is switched to Hi-output again, the input voltage (buffer voltage V12) to be input to the comparator portion 534 changes rapidly from $V_L$ (input voltage when the volume of air at the blower 100 is in Low-output) up to $V_H$ (input voltage when the volume of air at the blower 100 is in Hi-output) as shown by the broken line in FIG. 17. Accordingly, the rotation speed of the motor 120 will be increased rapidly. However, since the configuration shown in FIG. 16 causes the input voltage to be input to the comparator portion 534 to be increased gradually by the capacitor 550, a rapid increase of the rotation speed of the motor 120 can be suppressed.

Further, since the input voltage to be input to the comparator portion 534 changes gradually, the rotation speed of the motor 120 also changes gradually. Therefore, the volume of air at the blower 100 changes gradually, so that uncomfortable feeling experienced by the occupant can be reduced.

In the above-described embodiments, the input voltage generating portion 520 includes the array of resistors 521 consisting of three resistors. However, the present invention is not limited to this specific configuration, and the array of resistors may consist of two resistors or more than three resistors.

In the above-described embodiments, the car motor actuator 500 is applied to the motor 120 for driving the fan 130. However, the present invention is not limited to this specific configuration, and the car motor actuator may be applied to a motor for driving a device other than the fan.

In the above-described embodiments, the seat cushion S1 is exemplified as an example of the seat body. However, the present invention is not limited to this specific configuration. For example, the seat body may be the seat back S2. In this alternative configuration, the blower is provided at the rear of the seat back S2. The inlet port of the blower is directed toward the seat back S2 (i.e., frontward).

In the above-described embodiments, the bracket is located opposite to the inlet port. However, the present invention is not limited to this specific configuration, and the bracket may not be located opposite to the inlet port.

In the above-described embodiments, the blower is fixed to the bracket. However, the present invention is not limited to this specific configuration. For example, the blower may be directly fixed to the pan frame 30 or alternatively to another member other than the bracket.

In the above-described first embodiment, the bracket 200 has the recess 240. However, the present invention is not limited to this specific embodiment, and the recess 240 may not be provided.

In the above-described first embodiment, the recess 240 opens laterally at right and left sides thereof. However, the present invention is not limited to this specific configuration, and the recess may not open laterally.

In the above-described first embodiment, the connecting portions 230 extend laterally outward beyond the inlet port 113. However, the present invention is not limited to this specific configuration, and the connecting portions may not extend laterally outward of the inlet port 113.

In the above-described first embodiment, the front-side connecting pipe 40 is disposed in the recess 240. However, the present invention is not limited to this specific configuration, and the front-side connecting pipe may not be disposed in the recess 240.

In the above-described embodiments, the bracket is attached to the pan frame 30. However, the present invention is not limited to this specific configuration. For example, the bracket may be attached to another portion (e.g., S-shaped springs 20) other than the pan frame 30.

In the above-described embodiments, the car seat S used for an automobile is exemplified as a vehicle seat. However, the present invention is not limited to the car seat, and may be applicable to other vehicle seats, such as seats of rail cars, ships, and aircraft.

LIST OF REFERENCE SIGNS 1 seat cushion pad
1A air passage
10 side frame
30 pan frame
40 connecting pipe
100 blower
113 inlet port
114 outlet port
130 fan
200 bracket
210 base portion
220 opposed portion
230 connecting portion
240 recess
S1 seat cushion
S car seat

The invention claimed is:

1. A vehicle seat comprising:
a pair of side frames laterally spaced apart from each other;
a pan frame connecting the pair of side frames;
a connecting pipe connecting the pair of side frames;
a seat body having an air passage formed therein;
a blower located on one side of the seat body that is opposite to an occupant's side on which an occupant is to be seated;
a duct connecting the blower and the air passage; and
a bracket located under the seat body and used to fix the blower to the seat body, the bracket comprising:
a base portion, an extension portion protruding upward from the base portion, and
a recess recessed upward from the base portion, the extension portion being fixed to the pan frame, the base portion comprising:
a first fixing portion located frontward of the recess for the blower to be fixed thereto, and
a second fixing portion located rearward of the recess for the blower to be fixed thereto,
wherein the bracket is located in such a position that a part of the connecting pipe is disposed in the recess.

2. The vehicle seat according to claim 1, wherein the connecting pipe overlaps the blower as viewed from above or from below.

3. The vehicle seat according to claim 1, wherein the first fixing portion and the second fixing portion are located below the connecting pipe.

4. The vehicle seat according to claim 1, wherein the base portion further comprises:
a front-side base portion on which the first fixing portion is provided; and
a rear-side base portion on which the second fixing portion is provided, the rear-side base portion being located apart from the front-side base portion rearward.

5. The vehicle seat according to claim 4, wherein the recess has a front edge connected to a rear end of the front-side base portion, and a rear edge connected to a front end of the rear-side base portion.

6. The vehicle seat according to claim 5, wherein the recess has a right end and a left end uncovered to allow the part of the connecting pipe to be located therein.

7. The vehicle seat according to claim 1, wherein each of the first fixing portion and the second fixing portion is configured as a weld nut.

8. The vehicle seat according to claim 1, wherein the base portion further comprises:
another fixing portion for the blower to be fixed thereto, the another fixing portion being located frontward of the recess and apart from the first fixing portion, or rearward of the recess and apart from the second fixing portion.

9. A method for assembly of a vehicle seat with a pair of side frames laterally spaced apart from each other, a pan frame connecting the pair of side frames, a connecting pipe connecting the pair of side frames, a seat body having an air passage formed therein, a blower located on one side of the seat body that is opposite to an occupant's side on which an occupant is to be seated, and a duct connecting the blower and the air passage, the method comprising:
- providing a bracket comprising a base portion, an extension portion protruding upward from the base portion, and a recess recessed upward from the base portion, the base portion comprising a first fixing portion and a second fixing portion between which the recess is provided;
- locating the bracket in such a manner that a part of the connecting pipe is disposed in the recess of the bracket;
- fixing the extension portion of the bracket to the pan frame; and
- fixing the blower to the first fixing portion and to the second fixing portion.

10. The method according to claim 9, wherein the fixing the blower comprises:
- locating the blower under first fixing portion of the bracket, the second fixing portion of the bracket, and the part of the connecting pipe located in the recess of the bracket.

11. The method according to claim 9, wherein
the base portion further comprises a front-side base portion on which the first fixing portion is provided, and a rear-side base portion on which the second fixing portion is provided,
- each of the first fixing portion and the second fixing portion is configured as a weld nut, and the fixing the blower comprises:
- inserting a bolt through the front-side base portion into a weld nut provided on an upper surface of the front-side base portion; and
- inserting a bolt through the rear-side base portion into a weld nut provided on an upper surface of the rear-side base portion.

* * * * *